US006864831B2

(12) United States Patent
Woodington et al.

(10) Patent No.: US 6,864,831 B2
(45) Date of Patent: Mar. 8, 2005

(54) RADAR DETECTION METHOD AND APPARATUS

(75) Inventors: Walter Gordon Woodington, Lincoln, MA (US); Michael Joseph Delcheccolo, Westford, MA (US); Joseph S. Pleva, Londonderry, NH (US); Mark E. Russell, Westford, MA (US); H. Barteld Van Rees, Needham, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/229,256

(22) Filed: Aug. 26, 2002

(65) Prior Publication Data

US 2003/0001772 A1 Jan. 2, 2003

Related U.S. Application Data

(62) Division of application No. 09/930,869, filed on Aug. 16, 2001, now Pat. No. 6,577,269
(60) Provisional application No. 60/226,160, filed on Aug. 16, 2000.

(51) Int. Cl.[7] .............................................. G01S 13/93
(52) U.S. Cl. ............................. 342/70; 342/90; 342/95; 342/195
(58) Field of Search ............................. 342/70–72, 90, 342/95, 96, 195, 196, 160

(56) References Cited

U.S. PATENT DOCUMENTS

| 3,697,985 A | 10/1972 | Faris et al. |
| 3,727,215 A | * 4/1973 | Wilmot ....................... 342/90 |
| 3,935,559 A | 1/1976 | Straffon et al. |
| 3,940,696 A | 2/1976 | Nagy |
| 3,974,501 A | 8/1976 | Ritzie |

(List continued on next page.)

FOREIGN PATENT DOCUMENTS

| DE | 196 32 889 | 2/1998 |
| DE | 195 23 693 | 5/1998 |
| DE | 198 55 400 | 12/1998 |
| DE | 198 50 128 | 5/1999 |
| EP | 0.642 190 A1 | 12/1993 |
| EP | 0 887 658 | 12/1998 |
| EP | 0 932 052 | 7/1999 |
| EP | 0 978 729 A2 | 2/2000 |
| FR | 2 709 834 | 9/1993 |
| FR | 2754604 | 4/1998 |
| GB | 2267401 | 12/1993 |

OTHER PUBLICATIONS

: Ferryman, et al.; "Visual Surveillance for Moving Vehicles"; 1198; Proceedings 1998 IEEE Workshop on 1997; pp. 73–80.

(List continued on next page.)

Primary Examiner—Thomas H. Tarcza
Assistant Examiner—Isam Alsomin
(74) Attorney, Agent, or Firm—Daly, Crowley & Mofford, LLP

(57) ABSTRACT

A radar detection process includes computing a derivative of an FFT output signal to detect an object within a specified detection zone. In one embodiment, a zero crossing in the second derivative of the FFT output signal indicates the presence of an object. The range of the object is determined as a function of the frequency at which the zero crossing occurs. Also described is a detection table containing indicators of the presence or absence of an object within a respective radar beam and processing cycle. At least two such indicators are combined in order to detect the presence of an object within the detection zone.

18 Claims, 16 Drawing Sheets

U.S. PATENT DOCUMENTS

| | | |
|---|---|---|
| 3,978,481 A | 8/1976 | Angwin et al. |
| 4,003,049 A | 1/1977 | Sterzer et al. |
| 4,008,473 A | 2/1977 | Hinachi et al. |
| 4,008,475 A | 2/1977 | Johnson |
| 4,035,797 A | 7/1977 | Nagy |
| 4,063,243 A | 12/1977 | Anderson et al. |
| 4,079,377 A | 3/1978 | zur Heiden et al. |
| 4,143,370 A | 3/1979 | Yamanaka et al. |
| 4,203,113 A * | 5/1980 | Baghdady .................... 342/71 |
| 4,209,791 A | 6/1980 | Gerst et al. |
| 4,217,582 A | 8/1980 | Endo et al. |
| 4,246,585 A | 1/1981 | Mailloux |
| 4,308,536 A | 12/1981 | Sims, Jr. et al. |
| 4,348,675 A | 9/1982 | Senzaki et al. |
| 4,349,823 A | 9/1982 | Tagami et al. |
| 4,409,899 A * | 10/1983 | Owen et al. ................ 102/211 |
| 4,414,550 A | 11/1983 | Tresselt |
| 4,507,662 A | 3/1985 | Rothenberg et al. |
| 4,543,577 A | 9/1985 | Tachibana et al. |
| 4,549,181 A | 10/1985 | Tachibana et al. |
| 4,622,636 A | 11/1986 | Tachibana |
| 4,673,937 A | 6/1987 | Davis |
| 4,703,429 A | 10/1987 | Sakata |
| 4,718,558 A | 1/1988 | Castaneda |
| 4,901,083 A | 2/1990 | May et al. |
| 4,962,383 A | 10/1990 | Tresselt |
| 4,970,653 A | 11/1990 | Kenue |
| 4,994,809 A | 2/1991 | Yung et al. |
| 5,008,678 A | 4/1991 | Herman |
| 5,014,200 A | 5/1991 | Chundrlik et al. |
| 5,023,617 A | 6/1991 | Deering |
| 5,045,856 A | 9/1991 | Paoletti |
| 5,115,245 A | 5/1992 | Wen et al. |
| 5,134,411 A | 7/1992 | Adler |
| 5,138,321 A | 8/1992 | Hammer |
| 5,173,859 A | 12/1992 | Deering |
| 5,189,426 A | 2/1993 | Asbury et al. |
| 5,235,316 A | 8/1993 | Qualizza |
| 5,249,027 A | 9/1993 | Mathur et al. |
| 5,249,157 A | 9/1993 | Taylor |
| 5,252,981 A | 10/1993 | Grein et al. |
| 5,268,692 A | 12/1993 | Grosch et al. |
| 5,280,288 A | 1/1994 | Sherry et al. |
| 5,285,207 A | 2/1994 | Asbury et al. |
| 5,302,956 A | 4/1994 | Asbury et al. |
| 5,315,303 A | 5/1994 | Tsou et al. |
| 5,325,096 A | 6/1994 | Pakett |
| 5,325,097 A | 6/1994 | Zhang et al. |
| 5,339,075 A | 8/1994 | Abst et al. |
| 5,341,144 A | 8/1994 | Stove |
| 5,343,206 A * | 8/1994 | Ansaldi et al. ................ 342/70 |
| 5,351,044 A | 9/1994 | Mathur et al. |
| RE34,773 E | 11/1994 | Dombrowski |
| 5,390,118 A | 2/1995 | Margolis et al. |
| 5,394,292 A | 2/1995 | Hayashida |
| 5,396,252 A | 3/1995 | Kelly |
| 5,400,864 A | 3/1995 | Winner et al. |
| 5,414,643 A | 5/1995 | Blackman et al. |
| 5,451,960 A | 9/1995 | Kastella et al. |
| 5,454,442 A | 10/1995 | Labuhn et al. |
| 5,467,072 A | 11/1995 | Michael |
| 5,467,283 A | 11/1995 | Butsuen et al. |
| 5,471,214 A | 11/1995 | Faibish et al. |
| 5,479,173 A | 12/1995 | Yoshioka et al. |
| 5,481,268 A | 1/1996 | Higgins |
| 5,483,453 A | 1/1996 | Uemura et al. |
| 5,485,155 A | 1/1996 | Hibino |
| 5,485,159 A | 1/1996 | Zhang et al. |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,517,196 A | 5/1996 | Pakett et al. |
| 5,521,579 A | 5/1996 | Bernhard |
| 5,525,995 A | 6/1996 | Benner |
| 5,572,428 A | 11/1996 | Ishida et al. |
| 5,583,495 A | 12/1996 | Ben Lu lu |
| 5,587,908 A | 12/1996 | Kajiwara |
| 5,613,039 A | 3/1997 | Wang et al. |
| 5,619,208 A | 4/1997 | Tamatsu et al. |
| 5,625,362 A | 4/1997 | Richardson |
| 5,627,510 A | 5/1997 | Yuan |
| 5,633,642 A | 5/1997 | Hoss et al. |
| 5,654,715 A | 8/1997 | Hayashikura et al. |
| 5,670,963 A | 9/1997 | Kubota et al. |
| 5,675,345 A | 10/1997 | Pozgay et al. |
| 5,678,650 A | 10/1997 | Ishihara et al. |
| 5,689,264 A | 11/1997 | Ishikawa et al. |
| 5,712,640 A | 1/1998 | Andou et al. |
| 5,715,044 A | 2/1998 | Hayes |
| 5,717,399 A | 2/1998 | Urabe et al. |
| 5,719,580 A | 2/1998 | Core |
| 5,731,778 A | 3/1998 | Nakatani et al. |
| 5,734,344 A | 3/1998 | Yamada |
| 5,757,074 A | 5/1998 | Matloubian et al. |
| 5,757,307 A | 5/1998 | Nakatani et al. |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,808,561 A | 9/1998 | Kinoshita et al. |
| 5,808,728 A | 9/1998 | Uehara |
| 5,812,083 A * | 9/1998 | Johnson et al. ................ 342/90 |
| 5,818,355 A | 10/1998 | Shirai et al. |
| 5,839,534 A | 11/1998 | Chakraborty et al. |
| 5,905,472 A | 5/1999 | Wolfson et al. |
| 5,923,280 A | 7/1999 | Farmer |
| 5,926,126 A | 7/1999 | Engelman |
| 5,929,802 A | 7/1999 | Russell et al. |
| 5,938,714 A | 8/1999 | Satonaka |
| 5,940,011 A | 8/1999 | Agravante et al. |
| 5,949,366 A | 9/1999 | Herrmann |
| 5,959,570 A | 9/1999 | Russell |
| 5,977,904 A | 11/1999 | Mizuno et al. |
| 5,978,736 A | 11/1999 | Greendale |
| 5,999,092 A | 12/1999 | Smith et al. |
| 5,999,119 A | 12/1999 | Carnes et al. |
| 5,999,874 A | 12/1999 | Winner et al. |
| 6,011,507 A | 1/2000 | Curran et al. |
| 6,018,308 A | 1/2000 | Shirai |
| 6,026,347 A | 2/2000 | Schuster |
| 6,026,353 A | 2/2000 | Winner |
| 6,028,548 A | 2/2000 | Farmer |
| 6,037,860 A | 3/2000 | Zander et al. |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,049,257 A | 4/2000 | Hauk |
| 6,052,080 A | 4/2000 | Magori |
| 6,057,797 A | 5/2000 | Wagner |
| 6,069,581 A * | 5/2000 | Bell et al. ..................... 342/70 |
| 6,070,682 A | 6/2000 | Isogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,091,355 A | 7/2000 | Cadotte, Jr. et al. |
| 6,097,331 A | 8/2000 | Matsugatani et al. |
| 6,097,931 A | 8/2000 | Weiss et al. |
| 6,104,336 A | 8/2000 | Curran et al. |
| 6,107,956 A | 8/2000 | Russell et al. |

| | | |
|---|---|---|
| 6,114,985 A | 9/2000 | Russell et al. |
| 6,127,965 A | 10/2000 | McDade et al. |
| 6,130,607 A | 10/2000 | McClanahan et al. |
| 6,147,637 A | 11/2000 | Morikawa et al. |
| 6,147,638 A | 11/2000 | Rohling et al. |
| 6,154,168 A | 11/2000 | Egawa et al. |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,198,434 B1 | 3/2001 | Martek et al. |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,252,560 B1 | 6/2001 | Tanaka et al. |
| 6,255,984 B1 | 7/2001 | Kreppold et al. |
| 6,256,573 B1 | 7/2001 | Higashimata |
| 6,259,395 B1 | 7/2001 | Adachi et al. |
| 6,265,990 B1 | 7/2001 | Isogai et al. |
| 6,268,803 B1 | 7/2001 | Gunderson et al. |
| 6,269,298 B1 | 7/2001 | Seto |
| 6,278,400 B1 | 8/2001 | Cassen et al. |
| 6,289,332 B2 * | 9/2001 | Menig et al. ................... 707/1 |
| 6,307,622 B1 | 10/2001 | Lewis |
| 6,317,073 B1 | 11/2001 | Tamatsu et al. |
| 6,317,075 B1 | 11/2001 | Heide et al. |
| 6,317,090 B1 | 11/2001 | Nagy et al. |
| 6,320,547 B1 | 11/2001 | Fathy et al. |
| 6,327,530 B1 | 12/2001 | Nishimura et al. |
| 6,329,952 B1 | 12/2001 | Grace |
| 6,330,507 B1 | 12/2001 | Adachi et al. |
| 6,335,705 B1 | 1/2002 | Grace et al. |
| 6,345,227 B1 | 2/2002 | Egawa et al. |
| 6,351,702 B1 | 2/2002 | Tange et al. |
| 6,366,235 B1 | 4/2002 | Mayer et al. |
| 6,438,491 B1 * | 8/2002 | Farmer ........................ 701/301 |

OTHER PUBLICATIONS

: Woodington, et al.; U.S. patent application Publication No. U.S. 2002/0044082; Publication Date Apr. 18, 2002.

: Russell, et al.; U.S. patent application Publication No. U.S. 2002/0049539; Publication Date Apr. 25, 2002.

: Delcheccolo, et al.; U.S. patent application Publication No. U.S. 2002/0067287; Publication Date Jun. 6, 2002.

International Search Report of PCT Application No. PCT/US02/25677 dated Apr. 17, 2002.

International Search Report of PCT Application No. PCT/US01/25676 dated Dec. 21, 2001.

Partial International Search Report of PCT Application No. PCT/US01/25642 dated May 27, 2002.

International Search Report of PCT Application No. PCT/US01/25638 dated May 7, 2002.

International Search Report of PCT Application No. PCT/US01/42065 dated May 14, 2002.

Barnett, Roy I. et al. "A Feasibility Study of Stripline–Fed Slots Arranged as a Planar Array with Circular Grid and Circular Boundary", IEEE, 1989, pp. 1510–1515.

Bhattacharyya, Arum, et al. "Analysis of Stripline–Fed Slot–Coupled Patch Antennas with Vias for Parallel–Plate Mode Suppression", IEEE Transcations on Antennas and Propagation, vol. 46, No. 4, Apr. 1998, pp. 538–545.

Clouston E.N. et al. "A Triplate Stripline Slot Antenna Developed for Time–Domain Measurements on Phased Arrays", 1998, pp. 312–315.

Das, Nirod K. et al. "Multiport Scattering Analysis of General Multilayered Printed Antennas Fed by Multiple Feed Ports: Part II–Applications", IEEE, 1992, pp. 482–491.

Katehi, Pisti B. et al. "Design of a Low Sidelobe–Level––Stripline Fed Slot Array Covered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Stripline/Slot Transition", Electronics Letter, vol. 26 No. 15, pp. 1160–1161.

Sakaibara, Kunio et al. "A Single Layer Slotted Waveguide Array for 22GHz Band Radio System Between Mobile Base Stations", IEEE, 1994, pp. 356–359.

Sangster, Alan et al. "A Moment Method Analysis of a Transverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", 10th International Conference on Antennas and Propagation 14.17, Apr. 1997, 5 pages.

Theron, Isak Petrus et al. "On Slotted Waveguide Antenna Design at Ka–Band"; IEEE Trans. vol. 32, Oct. 1984, pp. 1425–1426.

* cited by examiner

RADAR DETECTION METHOD AND APPARATUS

CROSS-REFERENCE TO RELATED APPLICATIONS

This application is a Divisional Application of, and claims the benefit of, U.S. patent application Ser. No. 09/930,869 filed on Aug. 16, 2001 now U.S. Pat. No. 6,577,269 entitled "Radar Detection Method and Apparatus," which application claims the benefit of application Ser. No. 60/226,160 filed Aug. 16, 2000 under 35 U.S.C. §119(e), which applications are hereby incorporated herein by reference in their entirety.

STATEMENTS REGARDING FEDERALLY SPONSORED RESEARCH

Not applicable.

FIELD OF THE INVENTION

This invention relates generally to vehicle radar systems and more particularly to a radar system to detect other vehicles and objects in close proximity to the vehicle.

BACKGROUND OF THE INVENTION

As is known in the art, radar systems have been developed for various applications associated with vehicles, such as automobiles and boats. A radar system mounted on a vehicle detects the presence of objects including other vehicles in proximity to the vehicle. In an automotive application, such a radar system can be used in conjunction with the braking system to provide active collision avoidance or in conjunction with the automobile cruise control system to provide intelligent speed and traffic spacing control. In a further automotive application, the radar system provides a passive indication of obstacles to the driver on a display.

A continuing safety concern in the operation of automobiles is the difficulty in seeing objects in the side blind spots of the automobile. Accidents often occur when an automobile impacts another vehicle in its blind spot when changing lanes.

Rear and side view mirrors of various sizes and features are typically used in an effort to improve visualization of blind spots. For example, convex mirrors provide a larger view than flat mirrors. However, objects viewed in a convex mirror appear farther away than their actual distance from the vehicle. Also, the view through mirrors degrades during conditions of rain, snow, or darkness.

There is a need for an effective way to detect obstacles in a vehicle's blind spots, and generally in close proximity to the vehicle, which is accurate and reliable during all types of environmental conditions including rain, snow, and darkness. A further characteristic of an effective detection system is a well-defined detection zone within which there is a very high probability of detection, and outside of which there is a very low probability of detection.

SUMMARY OF THE INVENTION

A method for detecting an object with a radar system includes transmitting a transmit signal, receiving a receive signal generated by at least a portion of the transmit signal impinging on the object, calculating a difference signal in response to the transmit signal and the receive signal, performing an FFT on the difference signal to provide an FFT output signal, computing a derivative of the FFT output signal, and detecting the object in response to a zero crossing of the derivative of the FFT output signal. The range to the object is determined by the frequency at which the zero crossing of the FFT output signal occurs. In one embodiment, the derivative is a second derivative.

Also described is a method for detecting an object with a radar system which includes generating a detection table containing a plurality of indicators, each of which is indicative of the presence or absence of an object in proximity to the radar system. Each indicator is associated with a respective radar beam and processing cycle. The method further includes combining at least two of the indicators, and providing an object detection if at least one of the combined indicators indicates the presence of the object. In the illustrated embodiment, combined indicators are associated with different radar beams and/or different processing cycles.

With this arrangement, objects in proximity to the radar system are detected with high probability, and the range to the detected objects is determined with high accuracy. By using the detection table, the method provides a reduction in the probability of a false detection. Use of the derivative of the FFT output signal, and in particular the second derivative, permits detection of certain objects which might otherwise go undetected.

Radar apparatus for detecting an object includes a transmitter for generating a transmit signal, a receiver for receiving a receive signal generated by at least a portion of the transmit signal impinging the object, a differencing circuit for calculating a difference signal in response to the transmit signal and the receive signal, an FFT processor for performing an FFT on the difference signal to provide an FFT output signal, a derivative processor for computing a derivative of the FFT output signal, and a detector for detecting the object in response to a zero crossing of the derivative of the FFT output signal. The detector is further capable of determining the range to the object in response to the frequency at which the zero crossing of the derivative occurs.

The radar apparatus includes a memory in which is stored a detection table containing a plurality of indicators, each indicative of the presence or absence of the object. A processor is provided for combining at least two of the indicators in the detection table, and providing an object detection message if at least one of the combined indicators is indicative of the presence of the object.

The radar apparatus, like the detection techniques, provides reliable detection of objects in proximity to the radar system with high probability, and determines the range to the object with high accuracy.

BRIEF DESCRIPTION OF THE DRAWINGS

The foregoing features of this invention, as well as the invention itself, may be more fully understood from the following description of the drawings in which.

DESCRIPTION OF THE PREFERRED EMBODIMENT

Figure 1:
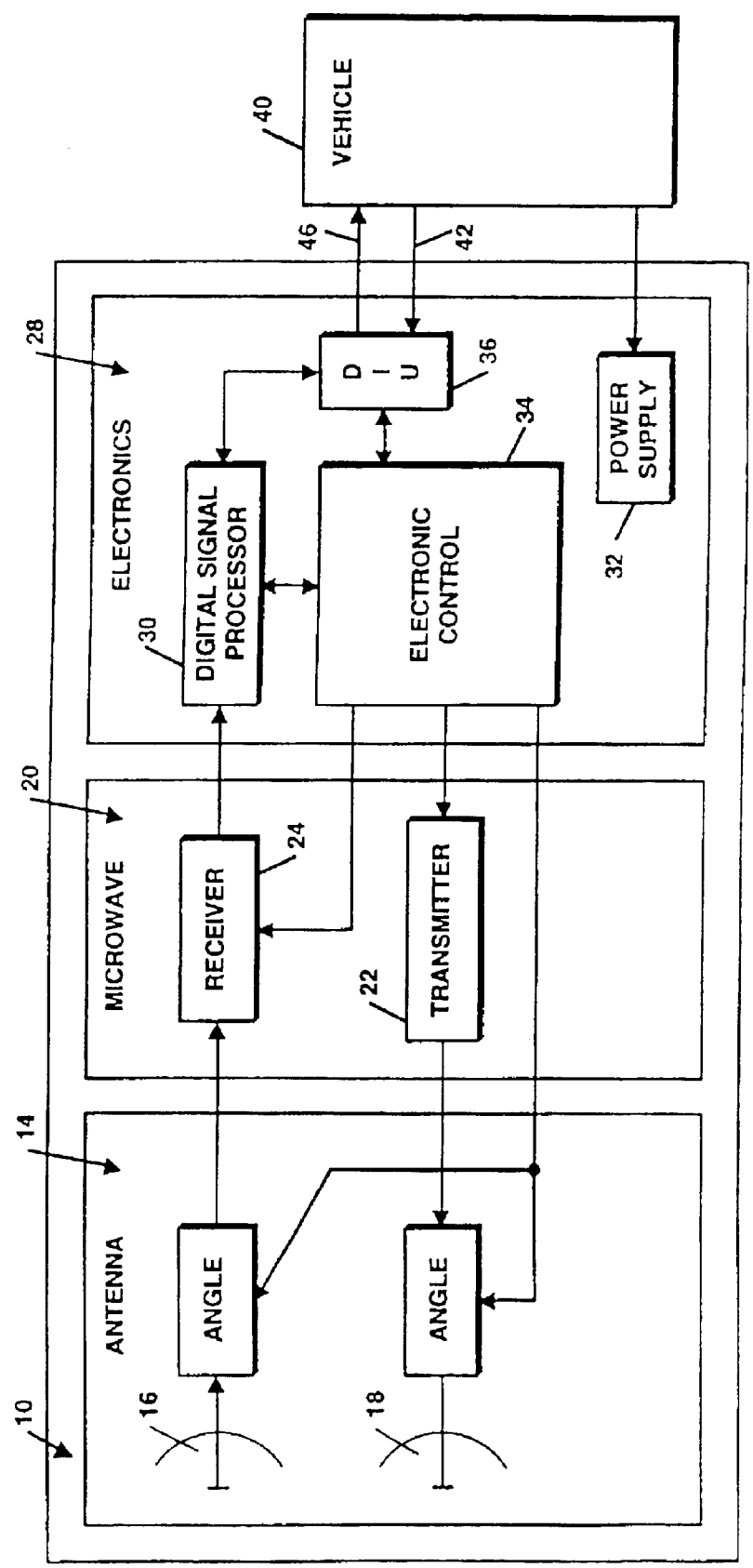
FIG. 1 is a block diagram of a radar system.

Referring to FIG. 1, a radar system 10 includes an antenna portion 14, a microwave portion 20 having both a transmitter 22 and a receiver 24, and an electronics portion 28 containing a digital signal processor (DSP) 30, a power supply 32, control circuits 34 and a digital interface unit (DIU) 36. The transmitter 22 includes a digital ramp signal generator for generating a control signal for a voltage controlled oscillator (VCO), as will be described.

The radar system 10 utilizes radar technology to detect one or more objects, or targets in the field of view of the system 10 and may be used in various applications. In the illustrative embodiment, the radar system 10 is a module of an automotive radar system (FIG. 2) and, in particular, is a side object detection (SOD) module or system adapted for mounting on an automobile or other vehicle 40 for the purpose of detecting objects, including but not limited to other vehicles, trees, signs, pedestrians, and other objects which can be located proximate a path on which the vehicle is located. As will be apparent to those of ordinary skill in the art, the radar system 10 is also suitable for use in many different types of applications including but not limited to marine applications in which radar system 10 can be disposed on a boat, ship or other sea vessel.

The transmitter 22 operates as a Frequency Modulated Continuous Wave (FMCW) radar, in which the frequency of the transmitted signal linearly increases from a first predetermined frequency to a second predetermined frequency. FMCW radar has the advantages of high sensitivity, relatively low transmitter power and good range resolution. However, it will be appreciated that other types of transmitters may be used.

Control signals are provided by the vehicle 40 to the radar system 10 via a control signal bus 42. The DSP 30 processes these control signals and radar return signals received by the radar system 10 in order to detect objects within the field of view of the radar system, as will be described in conjunction with FIGS. 10–16. The radar system 10 provides to the vehicle one or more output signals characterizing an object within its field of view via an output signal bus 46. These output signals may include a target detection signal when a target exceeds the system preset thresholds. The output signals may be coupled to a control unit of the vehicle 40 for various uses such as blind spot and near object detection.

The antenna assembly 14 includes a receive antenna 16 for receiving RF signals and a transmit antenna 18 for transmitting RF signals. The radar system 10 may be characterized as a bistatic radar system since it includes separate transmit and receive antennas positioned proximate one another. The antennas 16, 18 provide multiple beams at steering angles that are controlled in parallel as to point a transmit and a receive beam in the same direction. Various circuitry for selecting the angle of the respective antennas 16, 18 is suitable, including multi-position transmit and receive antenna switches.

Figure 2:
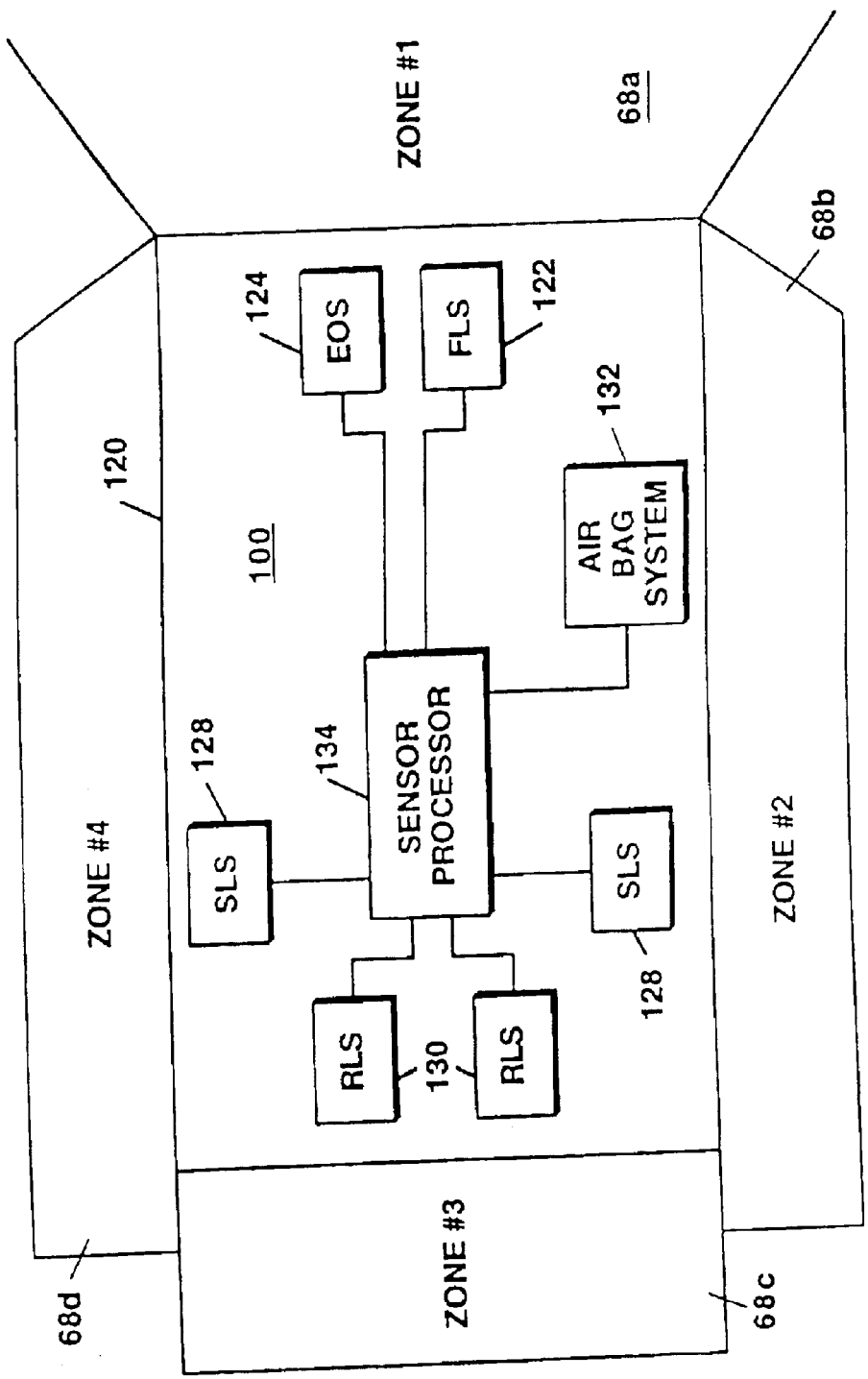
FIG. 2 is a block diagram of an automotive near object detection (NOD) system including a plurality of radar systems of the type shown in FIG. 1.
Figure 3:
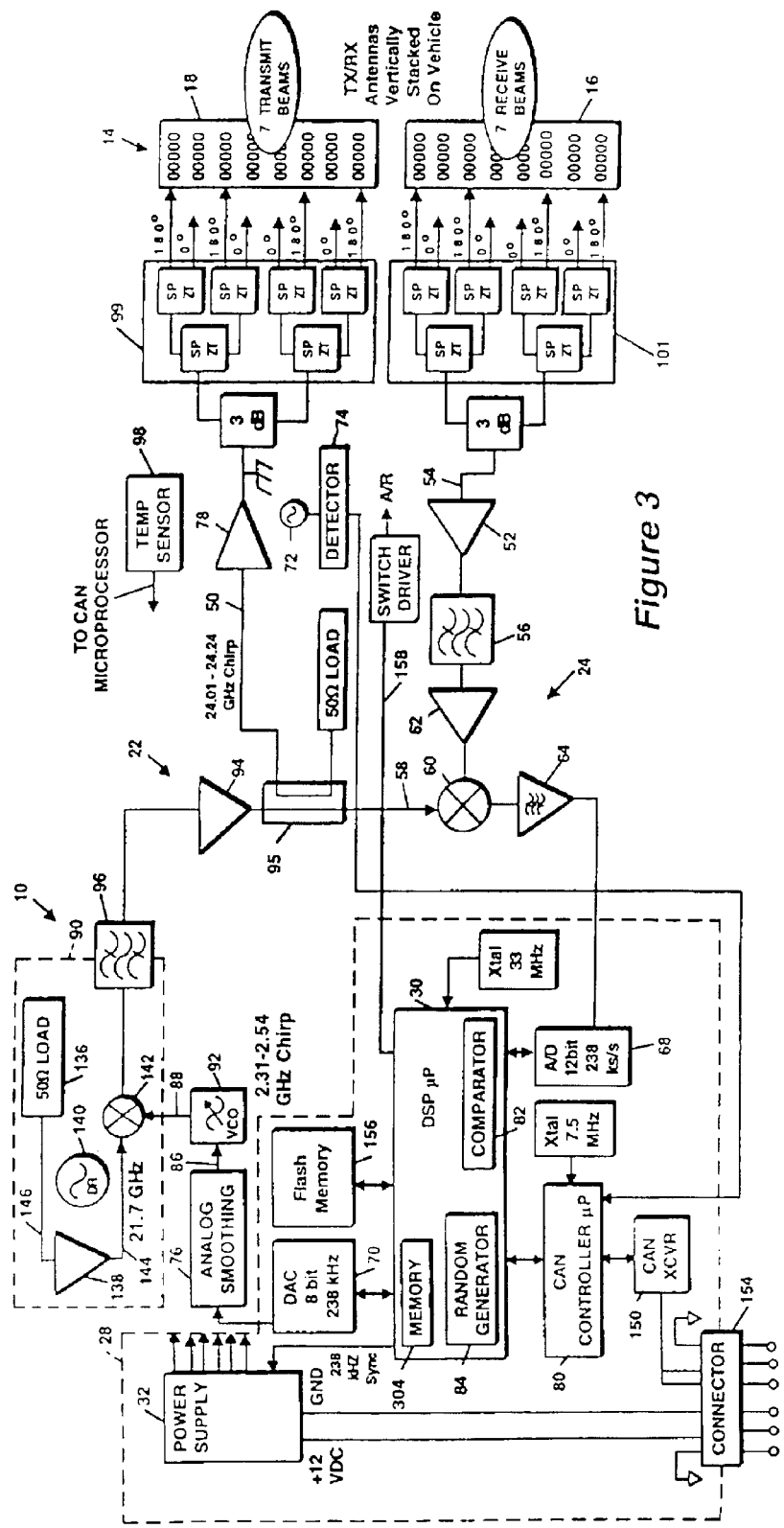
FIG. 3 is a detailed block diagram of a side object detection (SOD) system suitable for use in the NOD system of FIG. 2.

Referring also to FIG. 2, an illustrative application for the radar system 10 of FIG. 1 is shown in the form of an automotive near object detection (NOD) system 100. The NOD system 100 is disposed on a vehicle 120 which may be provided for example, as an automotive vehicle such as car, motorcycle, or truck, or a marine vehicle such as a boat or an underwater vehicle or as an agricultural vehicle such as a harvester. In this particular embodiment, the NOD system 100 includes a forward-looking sensor (FLS) system 122, an electro optic sensor (EOS) system 124, a plurality of side-looking sensor (SLS) systems 128 or equivalently side object detection (SOD) systems 128 and a plurality of rear-looking sensor (RLS) systems 130. In the illustrative embodiment, the radar system 10 of FIG. 1 which is shown in greater detail in FIG. 3 is a SOD system 128.

Each of the FLS, EOS, SLS, and RLS systems is coupled to a sensor processor 134. In this particular embodiment, the sensor processor 134 is shown as a central processor to which each of the FLS, EOS, SLS, and RLS systems is coupled via a bus or other means. It should be appreciated that in an alternate embodiment, one or more of the FLS, EOS, SLS, and RLS systems may include its own processors, such as the DSP 30 of FIG. 1, to perform the processing described below. In this case, the NOD system 100 would be provided as a distributed processor system.

Regardless of whether the NOD system 100 includes a single or multiple processors, the information collected by each of the sensor systems 122, 124, 128, 130 is shared and the processor 134 (or processors in the case of a distributed system) implements a decision or rule tree. The NOD system 100 may be used for a number of functions including but not limited to blind spot detection, lane change detection, pre-arming of vehicle air bags and to perform a lane stay function. For example, the sensor processor 134 may be coupled to the airbag system of the vehicle 132. In response to signals from one or more of the FLS, EOS, SLS, and RLS systems, the sensor processor may determine that it is appropriate to "pre-arm" the airbag of the vehicle. Other examples are also possible.

The EOS system 124 includes an optical or IR sensor or any other sensor which provides relatively high resolution in the azimuth plane of the sensor. The pair of RLS systems 130 can utilize a triangulation scheme to detect objects in the rear portion of the vehicle. The FLS system 122 is described in U.S. Pat. No. 5,929,802 entitled Automotive Forward Looking Sensor Architecture, issued Jul. 27, 1999, assigned to the assignee of the present invention, and incorporated herein by reference. It should be appreciated that each of the SLS and RLS sensors may be provided having the same antenna system.

Each of the sensor systems is disposed on the vehicle 120 such that a plurality of coverage zones exist around the vehicle. Thus, the vehicle is enclosed in a cocoon-like web or wrap of sensor zones. With the particular configuration shown in FIG. 2, four coverage zones 68a–68d are used. Each of the coverage zones 68a–68d utilizes one or more RF detection systems. The RF detection system utilizes an antenna system which provides multiple beams in each of the coverage zones 68a–68d. In this manner, the particular direction from which another object approaches the vehicle or vice-versa can be found. One particular antenna which can be used is described in U.S. patent application entitled Slot Antenna for an Array Antenna, filed on Aug. 16, 2001, and assigned application Ser. No. 09/931,633, and U.S. patent application entitled Switched Beam Antenna Architecture, filed on Aug. 16, 2001, and assigned application No. Ser. 09/932,574, each of which are assigned to the assignee of the present invention and incorporated herein by reference.

It should be appreciated that the SLS, RLS, and the FLS systems may be removably deployed on the vehicle. That is, in some embodiments the SLS, RLS, and FLS sensors may be disposed external to the body of the vehicle (i.e. on an exposed surface of the vehicle body), while in other systems the SLS, RLS, and FLS systems may be embedded into bumpers or other portions of vehicle (e.g. doors, panels, quarter panels, vehicle front ends, and vehicle rear ends). It is also possible to provide a system which is both mounted inside the vehicle (e.g., in the bumper or other location) and which is also removable. The system for mounting can be of a type described in U.S. patent application entitled System and Technique for Mounting a Radar System on a Vehicle, filed on Aug. 16, 2001, and assigned application Ser. No. 09/930,868, and U.S. patent application entitled Portable Object Detection System, filed on Aug. 16, 2001, and assigned application Ser. No. 09/931,276, each of which are assigned to the assignee of the present invention and incorporated herein by reference.

Referring also to FIG. 3, the radar system 10 of FIG. 1 for use as a SOD system 128 (FIG. 2) is shown in greater detail. In general overview of the operation of the transmitter 22, the FMCW radar transmits a signal 50 having a frequency which changes in a predetermined manner over time. The transmit signal 50 is generally provided by feeding a VCO control or ramp signal 86 to a voltage controlled oscillator (VCO) 92. In response to the ramp signal 86, the VCO 92 generates a chirp signal 88.

A measure of transmit time of the RF signal can be determined by comparing the frequency of a received signal 54 with the frequency of a sample 58 of the transmit signal. The range determination is thus provided by measuring the beat frequency between the frequencies of the sample 58 of the transmit signal and the return signal 54, with the beat frequency being equal to the slope of the ramp signal 86 multiplied by the time delay of the return signal. The measured frequency further contains the Doppler frequency due to the relative velocity between the target and the radar system. In order to permit the two contributions to the measured frequency shift to be separated and identified, the time-varying frequency of the transmit signal 50 is achieved by providing a control signal 86 to the VCO 92 in the form of a linear ramp signal followed by either a CW signal or a ramp with the opposite slope.

Figure 5:
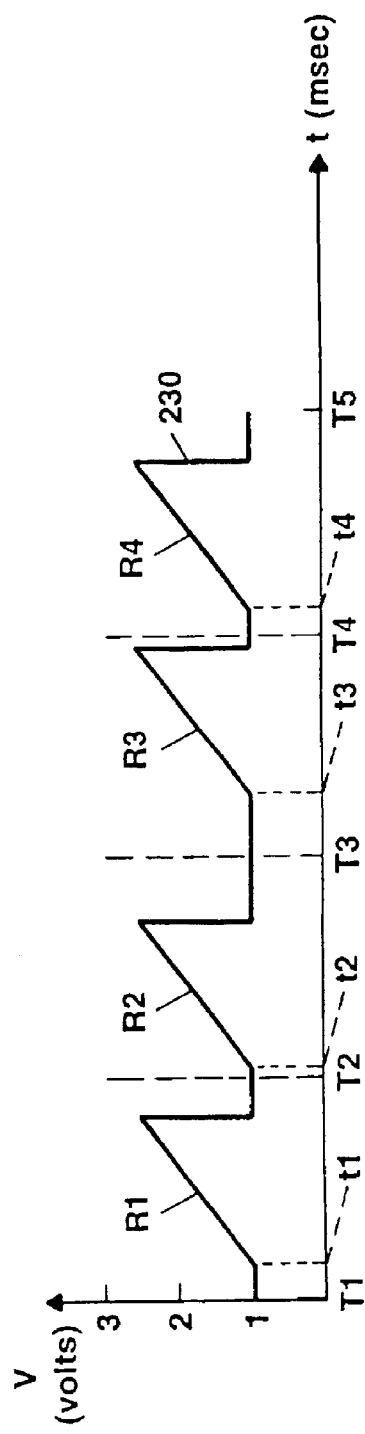
FIG. 5 is a plot of VCO control signal voltage vs. time which further illustrates VCO control signal waveforms provided by the ramp generator of FIG. 3 for implementing an interference reduction feature.
Figure 5A:
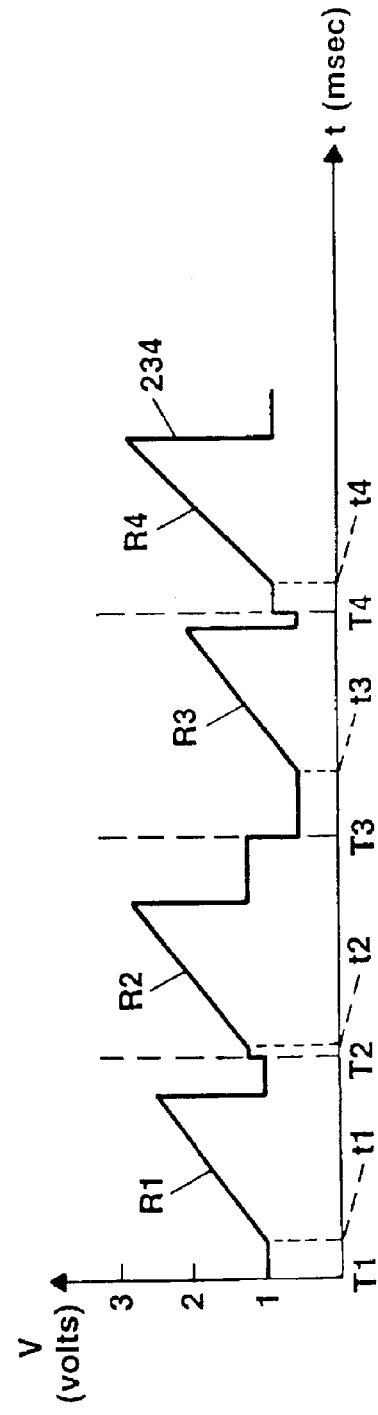
FIG. 5A is plot of VCO control signal voltage vs. time which illustrates yet another VCO control signal waveform provided by the ramp generator of FIG. 3 for implementing an alternative interference reduction feature.
Figure 6:
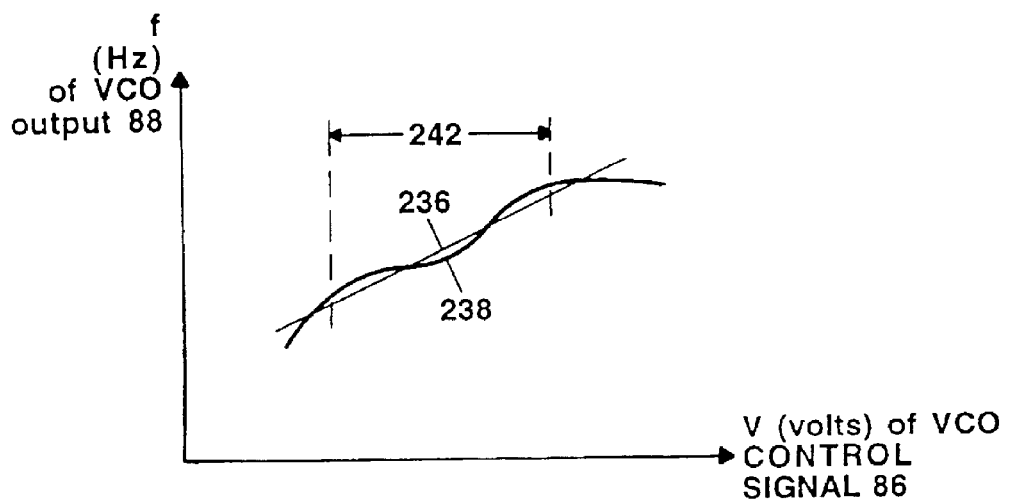
FIG. 6 is a plot of VCO control signal voltage vs. time which illustrates a non-linear relationship between a frequency of the VCO output signal of FIG. 3 and a voltage of the VCO control signal of FIG. 3.
Figure 6A:
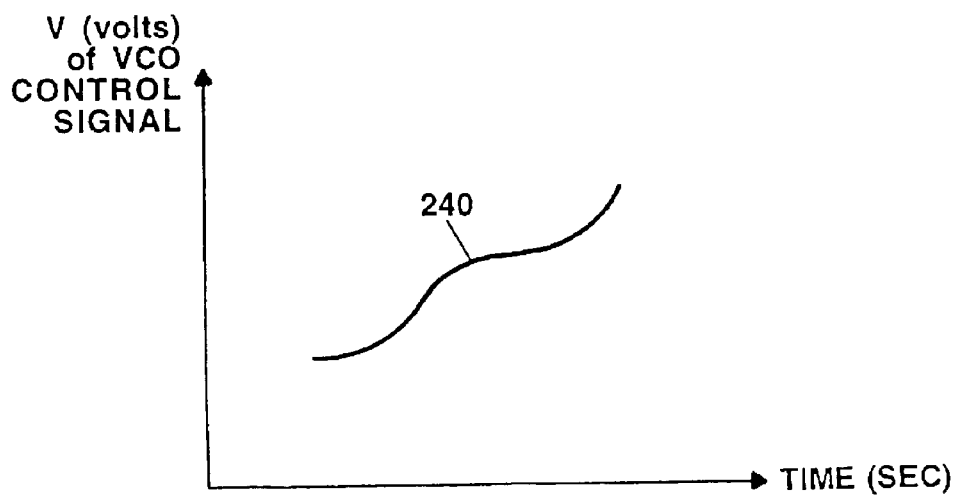
FIG. 6A is a plot of VCO control signal voltage vs. time which illustrates a relationship between the VCO control signal and the output of the DSP of FIG. 3 used to compensate for the non-linear VCO characteristic of FIG. 6.

According to one aspect of the invention, the VCO control signal 86 is generated with digital circuitry and techniques. In a preferred embodiment, the ramp signal 86 is generated by the DSP 30 and a digital-to-analog converter (DAC) 70. Use of the DSP 30 and DAC 70 to generate the ramp signal 86 is possible in the SOD system 10 since, it has been determined in accordance with the present invention, that by proper selection of the detection zone characteristics including but not limited to detection zone size, shape and resolution, precise linearity of the chirp signal 88 is not necessary. This is a result of the correlation that exists between the nonlinearities in the transmit and receive waveforms at close ranges. With this arrangement, the frequency of the transmit signal 50 is accurately and easily controllable which facilitates implementation of several advantageous and further inventive features. As one example, one or more characteristics of successive ramps in the ramp signal 86 are randomly varied in order to reduce interference between similar, proximate radar systems, as illustrated by FIGS. 5 and 5A. As another example, temperature compensation is implemented by appropriately adjusting the ramp signal 86, as will be described in conjunction with FIG. 4. Yet another example is compensation for non-linearity in the VCO operation, as illustrated by FIGS. 6 and 6A. Further, changes to the SOD system 10 which would otherwise require hardware changes or adjustments can be made easily, by simply downloading software to the DSP 30. For example, the frequency band of operation of the SOD system 10 can be readily varied, as may be desirable when the SOD is used in different countries with different operating frequency requirements.

The electronics portion 28 of the SOD system 10 in FIG. 3 includes the DSP 30, the power supply 32, and a connector 154 through which signal buses 42, 46 (FIG. 1) are coupled between the SOD system 10 and the vehicle 40 (FIG. 1). The digital interface 36 is provided in the form of a controller area network (CAN) transceiver (XCVR) 150 in FIG. 3 which is coupled to the DSP 30 via a CAN microcontroller 80. The CAN controller 80 has a system clock coupled thereto to provide frequency stability. In one embodiment, the system clock is provided as a crystal controlled oscillator. An analog-to-digital (A/D) converter 68 receives the output of a video amplifier 64 and converts the signal to digital form for coupling to the DSP 30 for detection processing. In one embodiment, the A/D converter 68 is provided as a twelve bit A/D converter. Those of ordinary skill in the art will appreciate, however, that any A/D converter having sufficient resolution for the particular application may be used. A digital signal bus 158 is coupled to antenna switch driver circuits 103 which in turn control microwave switches 99, 101 in order to provide control signals to drive the microwave switches which in turn control antenna steering. Also provided in the electronics portion 28 of the SOD system 10 is a memory 156 in which software instructions, or code and data are stored. In the illustrative embodiment of FIGS. 3 and 7, the memory is provided as a flash memory 156.

Figure 7:
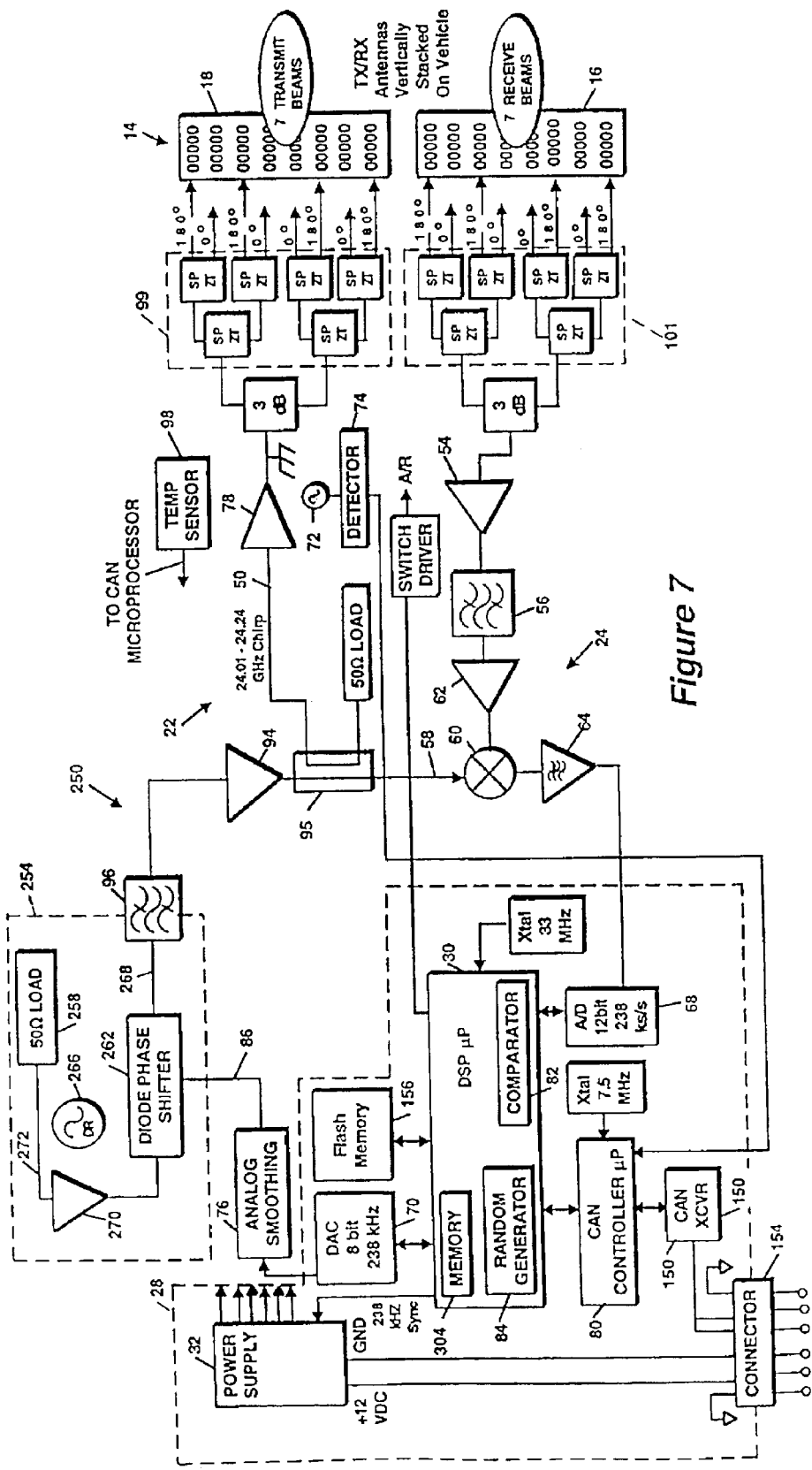
FIG. 7 is detailed a block diagram of an alternate SOD system embodiment.
Figure 8:
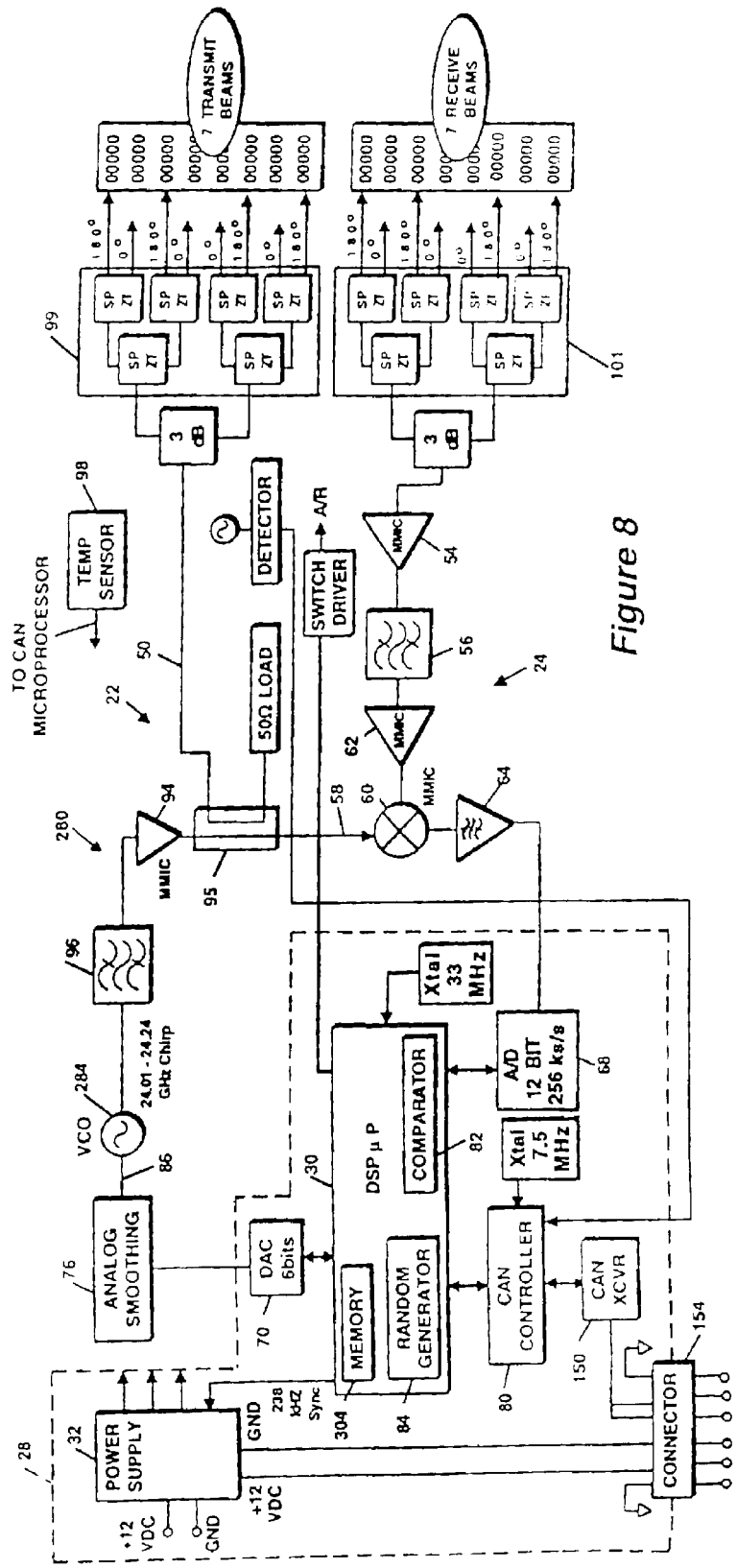
FIG. 8 is a detailed block diagram of a further alternate SOD system embodiment.

The DSP 30 provides the digital ramp output signals, or words to the DAC 70 which converts the ramp words into respective analog signals. An analog smoothing circuit 76 is coupled to the output of the DAC 70 in order to smooth the stepped DAC output to provide the ramp control signal 86 to the VCO 92. The DSP 30 includes a volatile memory device 304 (FIG. 9) in which is stored a look-up table containing a set of DSP output signals, or words in association with the frequency of the transmit signal 50 generated by the respective DSP output signal. This data is transferred to data RAM 304 from Flash memory 156 during initial boot up of the system. This data may be corrected from time to time as a result of temperature effects as described herein. In the illustrative embodiment, the VCO 92 is an SMV2488 device provided by Z Communications, Inc. of San Diego, Calif. and the VCO output signal 88 has a frequency in the range of 2.31 to 2.54 GHz The SOD embodiments of FIGS. 7 and 8 illustrate alternative VCO arrangements for generating the transmit signal.

An up-converter circuit 90 up-converts the VCO output signal 88 to a higher frequency as is desired for transmission in the illustrative automotive NOD system 100. In particular, the signal 88 is up-converted to a frequency of between 24.01 to 24.24 GHz. The up-converter 90 includes a 50 ohm load 136, an amplifier 138, a dielectric resonator (DR) 140, and a mixer 142. The amplifier 138, the dielectric resonator (DR) and the transmission lines 144, 146 form an oscillator circuit in which the DR 140 couples energy at its fundamental frequency and within its passband from transmission line 144 to transmission line 146 in order to generate an oscillator signal for coupling to mixer 142. In the illustrative embodiment, the oscillator signal on transmission line 144 has a nominal frequency of 21.7 GHz. The output of the mixer 142 is filtered by a bandpass filter 96 and is amplified by an amplifier 94. A portion of the output signal from amplifier 94, is coupled via coupler 95 to provide the transmit signal 50 for further amplification by amplifier 78 and transmission by transmitter antenna 18. Another portion of the output signal from amplifier 94 corresponds to a local oscillator (LO) signal 58 fed to an LO input port of a mixer 60 in the receive signal path.

The switch circuits 99, 101 are coupled to the transmit and receive antenna 16, 18 through a Butler matrix. The antennas 18, 16 and switch circuits 99, 101, and Butler matrix can be of the type described in U.S. patent application entitled Switched Beam Antenna Architecture, filed on Aug. 16, 2001, and assigned application Ser. No. 09/932,574, assigned to the assignee of the present invention, and incorporated herein by reference. Suffice it here to say that the switch circuits 99, 101 and Butler matrix operate to provide the antenna having a switched antenna beam with antenna beam characteristics which enhance the ability of the SOD system 10 to detect targets.

The received signal 54 is processed by an RF low noise amplifier (LNA) 52, a bandpass filter 56, and another LNA 62, as shown. The output signal of the RF amplifier 62 is down-converted by a mixer 60, which receives a local oscillator signal 58, coupled from the transmitter, as shown. Illustrative frequencies for the RF signals from the amplifier 62 and the local oscillator signal 58 are on the order of 24 GHz. Although the illustrated receiver 24 is a direct conversion, homodyne receiver, other receiver topologies may be used in the SOD radar system 10.

A video amplifier 64 amplifies and filters the down-converted signals, which, in the illustrative embodiment have a frequency between 1 KHz and 40 KHz. The video amplifier 64 may incorporate features, including temperature compensation, filtering of leakage signals, and sensitivity control based on frequency, as described in a co-pending U.S. patent application entitled "Video Amplifier for a Radar Receiver," and assigned application Ser. No. 09/931,593, filed on Aug. 16, 2001, assigned to the assignee of the present invention, and incorporated herein by reference.

The A/D converter 68 converts the analog output of the video amplifier 64 into digital signal samples for further processing. In particular, the digital signal samples are processed by a fast Fourier transform (FFT) within the DSP 30 in order to determine the content of the return signal within various frequency ranges (i.e., frequency bins). The FFT outputs serve as data for the rest of the signal processor 30 in which one or more algorithms are implemented to detect objects within the field of view, as will be described in conjunction with FIGS. 10–16.

The radar system 10 includes a temperature compensation feature with which temperature induced variations in the frequency of the transmit signal are compensated by adjusting the ramp signal 86 accordingly. For this purpose, the transmitter 22 includes a dielectric resonator (DR) 72 coupled to a microwave signal detector 74. The output of the microwave detector 74 is coupled to an analog-to-digital converter which is included in the CAN controller 80 (FIG. 9) for processing by the DSP 30.

In operation, the DR 72 couples energy to the detector 74 only when the transmit signal 50 has a frequency within a range around the fundamental resonant frequency of the DR (i.e., within the passband of the DR). In the illustrative embodiment, the DR 72 has a fundamental frequency within the transmit frequency range and a passband which is relatively narrow compared with the transmit frequency range. In this illustrative embodiment the DR is provided having a passband on the order of 10 MHz centered in the middle of the band of operation of the system in order to provide sufficient frequency detection resolution as will become apparent. The detector 74 detects output power from the DR 72 and provides an electrical signal indicative of a predetermined level of output power from the DR.

Detection of output power from the DR 72 indicates transmission of the DR's fundamental predetermined frequency. Further, transmission of the predetermined frequency corresponds to a predetermined DSP output word which, in turn, corresponds to "an expected" transmission frequency as specified in the look-up table.

In operation, when the DSP 30 receives an output signal via the CAN controller 80 from the frequency detector 72 and 74 indicating transmission of the predetermined frequency, the expected frequency associated with the DSP output is compared to the predetermined frequency by a software comparator 82 within the DSP. The measured time of detection and the commanded frequency is correlated in order to make an accurate frequency measurement. Any discrepancy between the expected frequency and the measured frequency indicates that an adjustment to the DSP output is necessary. Stated differently, a difference between the two frequencies indicates that the look-up table data needs to be corrected, since the expected frequency is not being transmitted in response to the corresponding DSP output.

By way of a simple example, consider the case where the look-up table indicates that a DSP output of 11110000 corresponds to a transmit frequency of 24.20 GHz and the DR 72 has a fundamental frequency of 24.20 GHz. Thus, detection of output power from the DR 72 indicates that 24.20 GHz is being transmitted. However, assume further that the detection occurs when the DSP output is given by 11110001. This scenario indicates that the DSP output words need to be adjusted and, specifically, need to be shifted down by one, in order to transmit the desired, expected frequency.

Various techniques may be used to compensate for the error between the transmitted frequency and the expected frequency. As one example, an offset equal to the amount of the error (i.e., the difference between the transmitted frequency and the DSP output word that is stored in the look-up table in association with the DRO's fundamental frequency) may be added or subtracted, depending on the direction of the offset, each time a new DSP output word is provided and until a new error is detected. Stated differently, each subsequent DSP output is simply shifted by the amount of the detected error. Since temperature generally does not change quickly, this error detection and correction may be performed relatively infrequently, such as once every 50 ms or 100 ms. It will be appreciated by those of ordinary skill in the art that other structures and techniques may be used for detecting the frequency of the transmit signal 50 to feedback to the DSP 30 for the purpose of adjusting the DSP output words in order to thereby adjust the frequency of the transmit signal.

Figure 4:
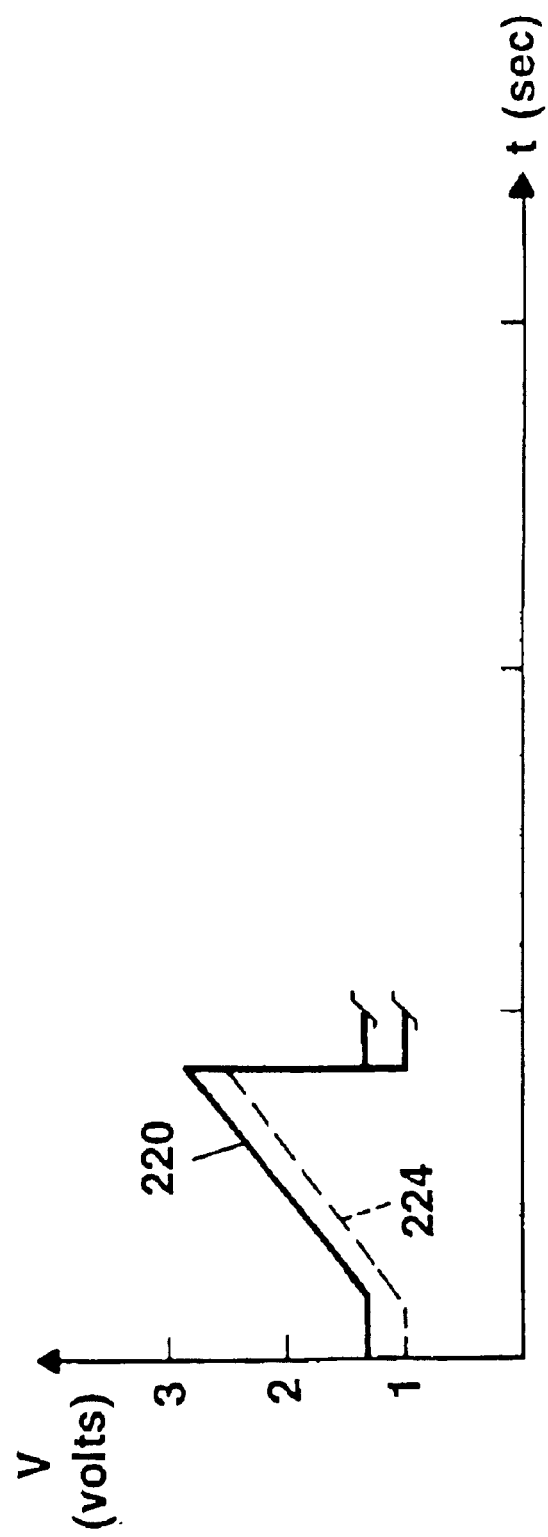
FIG. 4 is a plot of VCO control signal voltage vs. time which illustrates VCO control signal waveforms provided by the ramp generator of FIG. 3 for implementing a temperature compensation feature.

Referring also to FIG. 4, a single cycle of an illustrative ramp signal 220 as provided at the output of the DAC 70 (FIG. 3) is shown. In operation according to the above-described temperature compensation feature, detection of an error between the predetermined transmit signal frequency (i.e., the DRO fundamental frequency) and the expected transmit frequency associated with the DSP output word generating the predetermined frequency results in modification of the DSP output words as described above. The effect of shifting the DSP output words up or down is a shift of the ramp signal up or down, accordingly. For example, following correction of the DSP output, the nominal ramp signal 220 is shifted down in voltage to provide temperature compensated ramp signal 224, as shown.

An interference reduction feature of the SOD 10 according to a further aspect of the invention is implemented with a random, or pseudo-random number generator 84, (FIG. 3), as may be provided by software within the DSP 30. The random number generator 84 is used to randomly vary at least one aspect, and parameter of the ramp signal 86. Examples of such parameters are the offset interval of each chirp cycle as illustrated in FIG. 5 and the voltage (and thus frequency) range generated in each chirp cycle as illustrated in FIG. 5A.

Referring to FIG. 5, a plurality of cycles of an illustrative ramp signal 230, corresponding to ramp signal 86 (FIG. 3), for coupling to the VCO 92 are shown. Each ramp cycle starts at a time T1, T2, T3, . . . and has a ramp portion R1, R2, R3 . . . commencing at an offset time t1, t2, t3, . . . following the respective cycle start time T1, T2, T3, . . . , as shown. According to the invention, the duration of the offset interval of each cycle (i.e., intervals t1–T1, t2–T2, t3–T3, . . .) is randomly selected by the DSP 30. This is achieved by introducing a random delay corresponding to the offset interval into a recursive process by which the ramp signal is generated. In the illustrative embodiment, each ramp cycle is on the order of 1.1 msec and the offset interval of each cycle is randomly selected from one of sixteen possible intervals between 0 and 0.1 msec. As a result, at any given time, the frequency of the resulting transmit signal 50 will be different than the frequency of transmit signals from like radar systems, although the transmission frequency range of the radars will be the same.

With this arrangement, two identical SOD radar systems 10 operating proximate to each other over the same frequency range will not interfere with one another since, at any given time, the frequency of the transmit signals provided by the systems will vary randomly with respect to each other. This feature advantageously permits two or more identical SODs to be used on a vehicle, as is desirable to reduce the parts count of the NOD system and simplify replacement of one or more modules within the NOD system. A less desirable approach to reduce interference between proximate SODs would be to manually manipulate or program each SOD to ensure different transmit signals.

An alternative technique for reducing interference illustrated by the ramp signal 234 of FIG. 5A entails randomly varying the frequency range of the transmit signal 50 during each ramp cycle while still staying within the specified frequency range for the SOD system 10. This is achieved by introducing a random offset voltage to the ramp signal during each cycle while keeping the peak-to-peak ramp signal voltage constant (i.e., moving the ramp up or down while keeping peak-to-peak ramp voltage constant). For example, during the cycle commencing at time T1, the ramp R1 increases from 1 volt to 2.5 volts, thus corresponding to a first frequency range. During the next cycle, the ramp R2 increases from 1.25 volts to 2.75 volts, corresponding to a second different frequency range. In the illustrative embodiment, the frequency range of the transmit signal 50 is randomly selected from twenty-four different frequency ranges.

Various techniques in either the analog or digital portions of the circuitry, are possible for introducing an offset voltage to the ramp signal in order to randomly vary the voltage range. As one example, the offset voltage is introduced by the smoothing circuit 76 (FIG. 3).

It will be appreciated that although the ramps R1, R2, R3, . . . of the ramp signal 234 of FIG. 5A have random offset intervals (i.e., offset intervals computed as t1–T1, t2–T2, t3–T3, . . . ) as described above in conjunction with FIG. 5, the transmit frequency range can be randomly varied without also varying the offset interval. Stated differently, the technique of randomly varying the offset interval of each ramp cycle and randomly varying the frequency range of each ramp cycle can be implemented separately or in combination. It will also be appreciated that although the offset interval of each ramp cycle is randomly varied in FIGS. 5 and 5A and the voltage range is randomly varied in each ramp cycle in FIG. 5A, the selected parameter(s) may be randomly varied in one or more of the ramp cycles and need not be randomly varied in every ramp cycle.

Another feature of the SOD system 10 is compensation for non-linear operation of the VCO 92 (FIG. 3). FIG. 6 shows a curve 238 representing the relationship between the frequency of the VCO output signal 88 (FIG. 3) versus the VCO control signal voltage 86, (FIG. 3). The illustrative curve 238 has a typical frequency range on the order of 180 MHz and a typical voltage range on the order of 1.25 volts.

Although in an ideal VCO the relationship is linear as illustrated by curve 236, typically there is some non-linearity, as shown in the curve 238. This non-linearity is compensated, or nulled by adjusting the DSP output words accordingly. More particularly, the DSP output words are adjusted in order to provide ramp voltage (i.e., DAC output voltage) that is substantially complementary with respect to the actual curve 238. Such a complementary curve 240 is shown in FIG. 6A.

The operation of VCO 92 is characterized (i.e., a curve like FIG. 6 is generated) by feeding a sequence of DSP output words to the DAC 70 and measuring the transmit frequency with a test receiver (not shown). Such VCO characterization can be done at manufacture or prior to or after insertion of the VCO in the SOD system 10 or prior to or after placing a SOD system on a vehicle. Having characterized the VCO, the complementary curve of FIG. 6A is simply determined by taking the complement of the curve with respect to the ideal characteristic (labeled 236 in FIG. 6). A sequence of DSP output words necessary to generate the VCO control signal 240 of FIG. 6A can then be determined. By way of a simple example, where prior to characterization of the VCO, a DSP output sequence of 00000000, 00000001, 00000010, 00000011, . . . might be used to generate a linear ramp, in order to compensate for the VCO non-linearity, the sequence might be adjusted to 00000000, 00000000, 00000001, 00000010, . . . . The process of determining the necessary sequence of DSP output words to generate the control signal 240 can be performed manually or can be automated and preferably is repeatable from system to system. Typically, the correction to the DSP output words is made in software and stored in memory.

With knowledge of the way in which VCO output frequency varies with input voltage, the VCO control voltage 86 can be adjusted in order to force the output frequency of the VCO to be swept in a desired manner. Although the relationship between VCO output and VCO input is non-linear, the relationship between VCO output and DSP output is substantially linear.

Also, it will be appreciated that, given knowledge of the FIG. 6 characteristic curve 238 of the VCO 92, the system may be optimized to operate over a particular input voltage range to the VCO. Specifically, the most linear region of operation of the VCO (as labeled 242 in FIG. 6) can be selected as the DAC output voltage range simply by selecting a range of DSP output words necessary to generate the desired DAC output voltage range.

Referring also to FIG. 7, an alternate SOD system 250 differs from the SOD system 10 of FIG. 3 in the VCO portion of the transmitter 22 which processes the ramp signal 86 to generate the transmit signal 50. Portions of the SOD system 250 which are identical to the SOD system 10 of FIG. 3 have like reference numbers. Like the VCO 92 of FIG. 3, the VCO 254 is responsive to the ramp signal 86 and provides an output signal to a bandpass filter 96 which, in turn, provides an output signal having the desired transmit frequency in the range of 24.01 to 24.24 GHz.

The SOD system 250 includes a VCO 254 in the form of a voltage controlled DRO 254. The VCO 254 further includes a 50 ohm load 258 coupled to an amplifier 270 which, in turn, is coupled to a diode phase shifter 262. The phase shifter 262, signal coupling paths 268, 272, amplifier 270 and dielectric resonator 266, form an oscillation loop.

In operation, the DR 266 transfers signals within its passband from transmission line 268 to transmission line 272. The signal is amplified by amplifier 270 until the amplifier saturates. The passband of the DR 266 is selected to cover the desired frequency range of transmission which, in the illustrative embodiment is a range of 24.01–24.24 GHz. The final frequency of the signal on transmission line 268 is controlled by adjusting the phase shift introduced by the phase shifter 262. In this way, the diode phase shifter 262 provides phase reinforcement on the oscillation loop so that the oscillation loop seeks out the frequency determined by the feedback loop which includes the phase shifter and the DR. In general, a feedback loop will oscillate at a frequency whereby a feedback signal, for example a signal on signal path 272, achieves zero degrees phase (or any multiple of three hundred sixty degree phase) as it travels around the loop back to its starting point, with a loop gain, or gain around the loop, greater than one. Thus, by altering phase shifter 262, the frequency at which the feedback signal will achieve zero degrees will be similarly altered, and, so long as the loop gain remains greater than one, the loop will oscillate at the altered frequency. With the arrangement of FIG. 7, up converting of the signal provided by the VCO 254 is not necessary since the VCO operates within the desired transmit frequency range to generate the transmit signal 50.

Referring also to FIG. 8, another alternate SOD system 280 differs from the SOD system 10 of FIG. 3 in the VCO portion of the transmitter and the antenna arrangement. Portions of the SOD system 280 which are identical to the SOD system 10 of FIG. 3 have like reference numbers.

The SOD 280 includes a VCO 284 receiving ramp signal 86 from the analog smoothing circuit 76. The VCO 284 operates in the transmit frequency range of between 24.01 to 24.24 GHz and provides an output signal to bandpass filter 96, as shown. Since the VCO 284 operates in the transmit frequency range, the need for up-converting of the VCO output signal (FIG. 3) is eliminated.

It will be appreciated by those of ordinary skill in the art that features, components, elements and other portions of the SOD system 10 of FIG. 3, the SOD system 250 of FIG. 7, and the SOD system 280 of FIG. 8 may be mixed and matched. As one example, it will be appreciated that the antenna arrangement of FIG. 3 may be used with the VCO 254 of FIG. 7 or the VCO 284 of FIG. 8.

Figure 9:
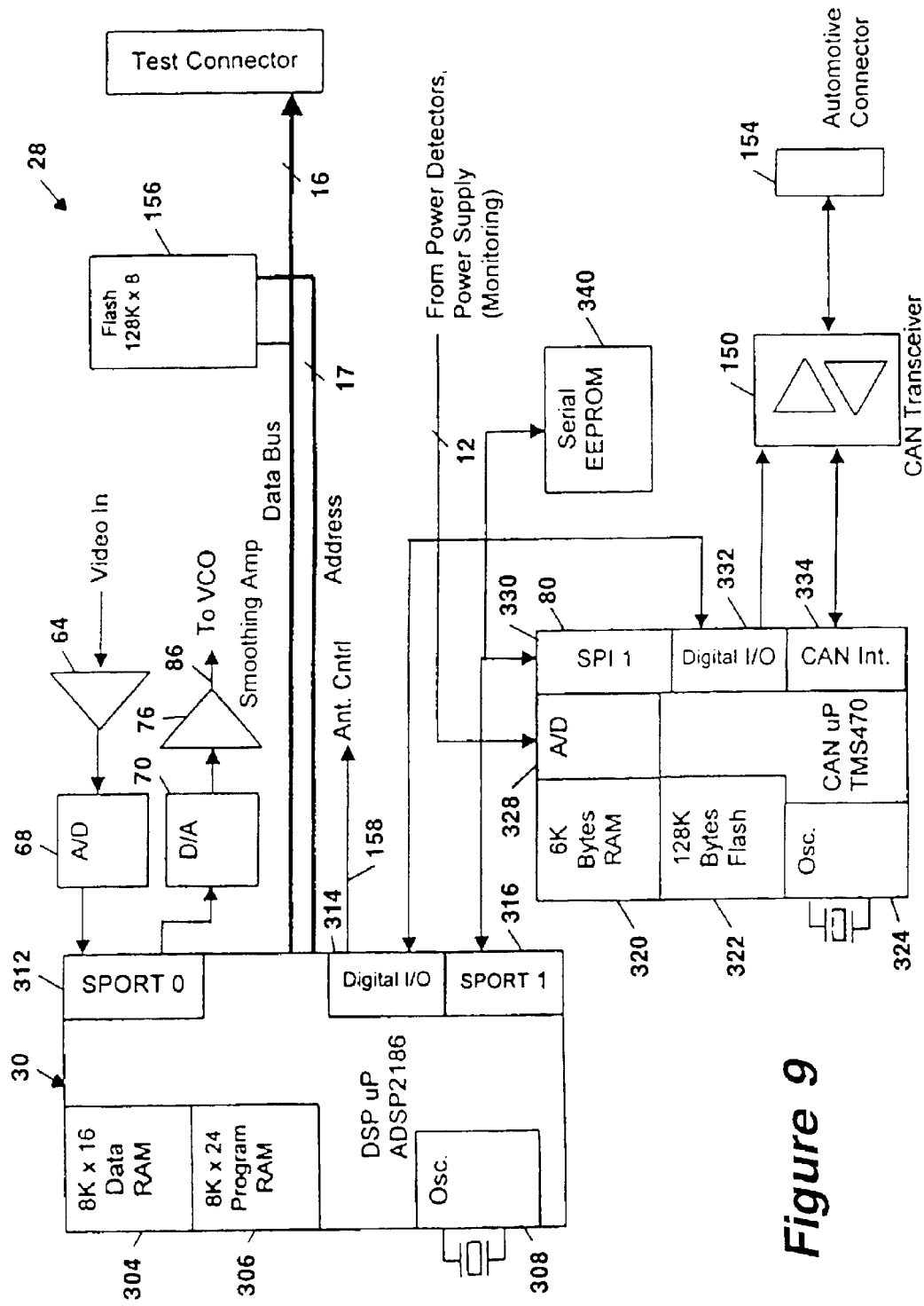
FIG. 9 is a block diagram of an illustrative architecture for the DSP of FIG. 3, 7, and 8.

Referring to FIG. 9, a block diagram of the SOD electronics 28 (FIGS. 1, 3, 7, and 8) is shown in greater detail to include the DSP 30, the CAN microprocessor 80, the CAN transceiver 150, power supply 32, and the memory 156. The memory 156 provides non-volatile storage of data and program information. Also shown is the video amplifier 64 providing an output signal to the A/D converter 68 which is coupled to port 312 of the DSP 30. In one embodiment, the memory 156 is provided as a 128 k×8 flash memory and the port 312 is provided as a serial port of the DSP 30. The D/A converter 70 receives the digitized ramp signal in the form of a sequence of digital words from the DSP through the port 312, as shown, and is further coupled to the smoothing circuit 76.

The DSP 30 includes RAM 304 in which data is stored, such as the look-up table of VCO control signal voltage 86 versus transmit frequency, and a program RAM 306 in which process instructions are stored, such as software code used to implement the detection algorithm described below. Program and data information stored in memory 156 are transferred to program RAM 306 and data RAM 304, respectively, upon application of power. The illustrative DSP 30 is an ADSP2186M microprocessor manufactured by Analog Devices, Inc. and includes an oscillator 308 operating at 33 MHz which is doubled internally to 66 MHz which is the clock rate of the DSP.

The DSP 30 further includes digital input/output (I/O) port 314 at which the antenna control signals are provided on bus 158. The DSP 30 communicates with the CAN microprocessor 80 via the digital I/O 314 and a serial port 316 which is further coupled to a serial EEPROM 340. The serial EEPROM 340 is used to hold data such as calibration constants and diagnostic test results and trouble codes.

In the illustrative embodiment, the random number generator 84 (FIG. 3) used to implement temperature compensation and the comparator 82 (FIG. 3) used to compensate for non-linear VCO operation are implemented by the DSP as a series of software instructions stored in the program RAM 306 and executed by the microprocessor. It will be appreciated by those of ordinary skill in the art however that these functional blocks as well as others may be implemented in hardware, firmware, software or a combination of hardware, firmware or software.

The illustrative CAN microprocessor 80 is a TMS470R1F316, a member of the TMS470 family from Texas Instruments and includes RAM 320, flash memory 322, an A/D converter 328, serial ports 330, digital I/O ports 332, a CAN interface 334, and an oscillator 324, here operating at 4.915 MHz. The CAN microprocessor 80 is coupled to the DSP 30 through serial port 330 and digital I/O 332 and is coupled to the CAN transceiver 150 through digital I/O 332 and the interface 334, as shown.

The CAN A/D converter 328 has a plurality of multiplexed inputs adapted for receiving various monitoring signals. As examples, the output of frequency detector 74 (FIG. 3) is coupled to the CAN A/D converter 328. Another optional input to the CAN A/D converter 328 is provided by a temperature sensor 98 (FIG. 3). The temperature sensor provides an output signal indicative of the temperature of the receiver 22 and may be used separately or in conjunction with features of the oscillator 90 (FIG. 3) to compensate for temperature induced frequency variations in the RF VCO 90. Optional detectors for detecting power supply faults may also be coupled to the A/D converter 328. The CAN A/D converter 328 converts the received signals to digital form for further processing, generally by the DSP 30.

Figure 10:
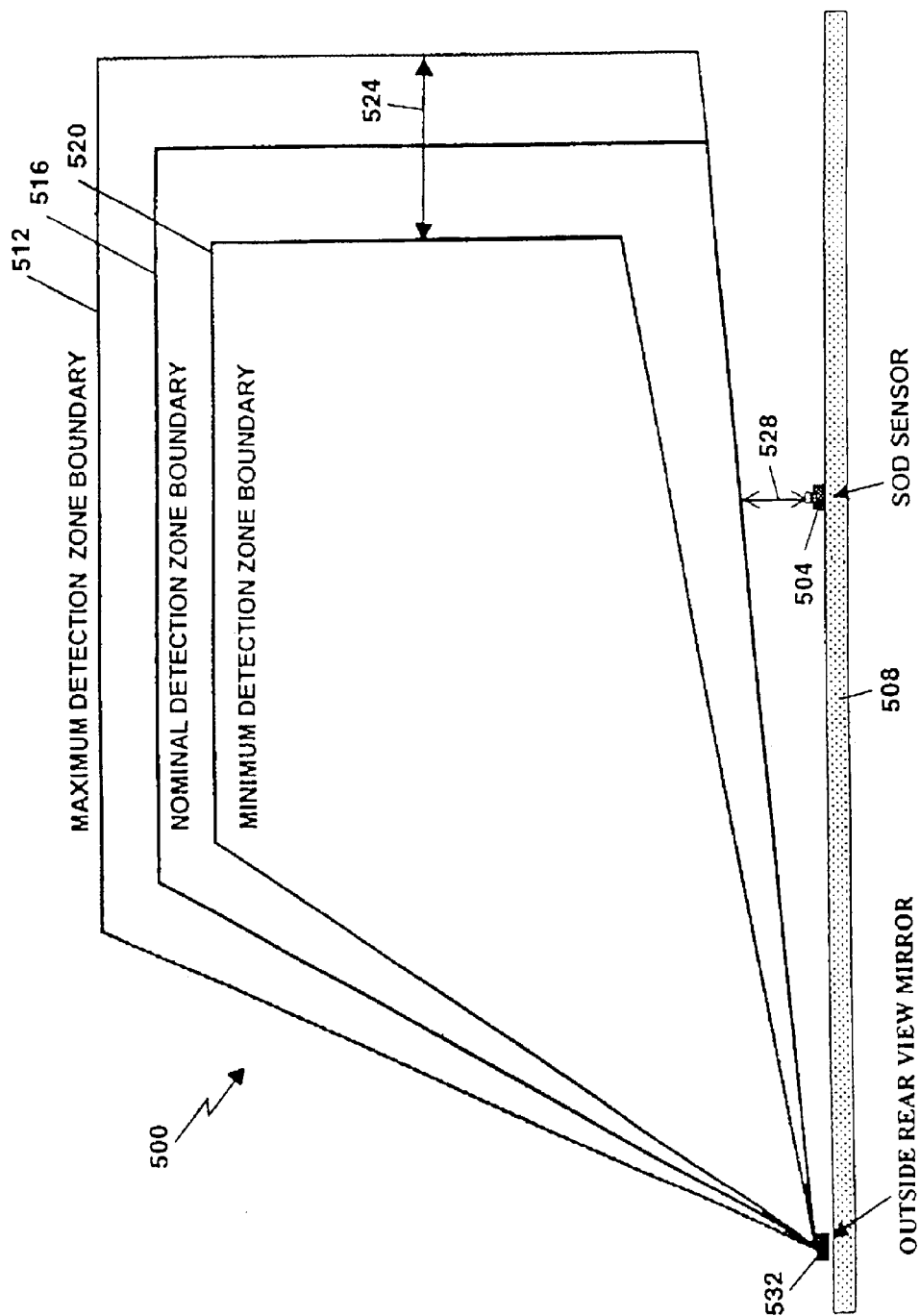
FIG. 10 is a diagrammatic view of an exemplary detection zone provided by a SOD system disposed on a vehicle.

Referring now to FIG. 10, an exemplary detection zone 500, shown in top view, is an azmuthal region in which a SOD system 504 (also referred to as a SOD sensor 504) which may be of the type described above in FIGS. 1–9 is specified to detect objects. Only objects within a specific detection zone 500 in proximity to an automobile 508 on which the SOD system 504 is mounted are included in a detection, and objects outside of the detection zone 500 are excluded.

The detection zone shape, of which the indicated zone 500 is only one example, depends upon the application in which the radar system is used. For example, an automobile SOD system is designed to detect objects in the adjacent lane of traffic including objects within the blind spot of the vehicle. Detection of objects in lanes of traffic beyond the adjacent traffic lane and outside of the blind would be undesirable. As another example, an automobile FLS system 122 (FIG. 2) used for purposes including but not limited to collision avoidance is designed to detect objects generally in front of the vehicle. Thus, each application requires a different shape of detection zone 500.

The sideward detection zone 500 includes a maximum detection zone boundary 512, a minimum detection zone boundary 520, and a nominal detection zone boundary 516 between the maximum and minimum detection zone boundaries. In a preferred embodiment, the SOD system 504 does not detect objects outside of the maximum detection zone boundary 512 and always detects objects within the minimum detection zone boundary 520. A probability region 524 exists between the maximum detection zone boundary 512 and the minimum detection zone boundary 520. The SOD system may or may not detect an object in the region 524. Probability region 524 exists due to imperfections and tolerances of practical circuit components which make up the SOD system 524. Ideally, the region 524 would have a width of 0 meters. Thus, the probability of detection in the probability zone is between zero and one hundred percent. An exemplary probability region 524 has a maximum width of 0.6 meters. The detection zone 500 further includes a minimum range 528 which is the distance from the SOD system to the closest object that will be detected. In the illustrative SOD system 504, the nominal detection zone boundary has an average width on the order of ten meters and an average length on the order of four meters. The minimum range 528 is on the order of 0.25 meters.

The size and shape specifications of the detection zone 500 and probability region 524 dictate many design parameters associated with the SOD system architecture. For example, in order to provide a SOD system performance that can transition from no detections to certain detections within a given probability region 524, the SOD system 504 can determine the range to an object with a measurement accuracy which is relatively high compared with the width of the probability region 524. For example, in the case where the probability region has a width of 0.6 meters, the measurement accuracy of the SOD system should be on the order of 0.06 meters.

As another example of a system parameter determined by the detection zone 500, the specification of a wide detection zone boundary 512–520 in azimuth relative to the SOD system 504, requires a wide radar coverage in azimuth. Furthermore, a detection zone boundary 512–520 with a complex contour requires that multiple beams be used in the detection algorithm, each with a different detection range. The beams related to the detection zone will be shown in greater detail in association with FIGS. 11A and 11B.

For another example, the specified minimum range 528 of the detection zone 500, can preferably be achieved with a system architecture that uses a chirp signal, like the FMCW chirp signal described above in conjunction with FIG. 3. In particular, the Federal Communications Commission (FCC) has specified that low power radar, at power of six decibels (6 dB) effective isotropic radiated power (6 $dB_{eirp}$) such as that used by the SOD systems discussed above, can have a frequency bandwidth no greater than 200 MHz. As will become apparent from the following description, the short range requirement 528 and the FCC bandwidth requirement together preclude the use of conventional pulsed radar.

The FCC 200 MHz bandwidth requirement is met by the SOD system being an FMCW system since a slowly varying FMCW signal can be generated with a narrow bandwidth of 200 MHz. For example, the SOD system 504 generates a transmit signal having a frequency which increases from approximately 24.000 GHz to 24.200 GHz in approximately 1 ms and has a bandwidth of 200 MHz. In contrast, conventional pulsed radar in a short range application cannot meet the 200 MHz FCC bandwidth requirement. A pulsed radar is also limited in its ability to detect objects at short ranges. This is because, in order to operate at the short ranges required of the SOD system, a pulsed radar system would require a very short radar pulse. Not only is such a short pulse technically difficult to achieve, but also, as the pulse width becomes narrower, the bandwidth of the transmitted signal becomes wider. A pulsed radar with pulse widths sufficiently short to enable operation at a minimum range 528 on the order of 0.25 meters fundamentally requires a frequency bandwidth in excess of 200 MHz. Thus, the characteristics of the detection zone 500 impact the system design in many ways. The detection algorithm processing that operates upon the received echoes, or signals, is also selected to operate with detection zones having particular characteristics. The detection algorithm is described below in conjunction with FIG. 12.

While a detection zone 500 to the side of the automobile is indicated, it should be recognized that other detection zones of specified sizes and shapes can be equivalently specified around the automobile 508, such as those shown in FIG. 2. For example, frontal zones and rearward zones can be specified without departing from this invention. Typically, an automobile manufacturer specifies one or more detection zones, including zone size, shape and position relative to the automobile. The SOD system 504 can be configured so as to provide the appropriate side detection zone 500 regardless of where it is mounted on the side of the automobile. Other probability zones 524 and other minimum detection ranges 528 are also possible with this invention.

Also, while the SOD system 504 is shown at a position to the rear of the outside rear view mirror 532, the detection zone 500 and the resulting SLS sensor 504 location can be located anywhere along the perimeter of the automobile 508.

Figure 11A:
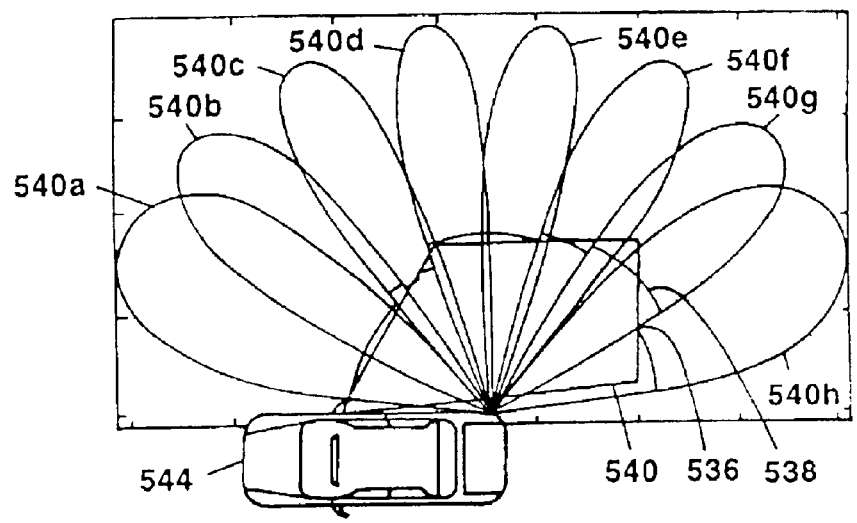
FIG. 11A and 11B are diagrammatic views of alternative detection zones which can be provided by the SOD system.
Figure 11B:
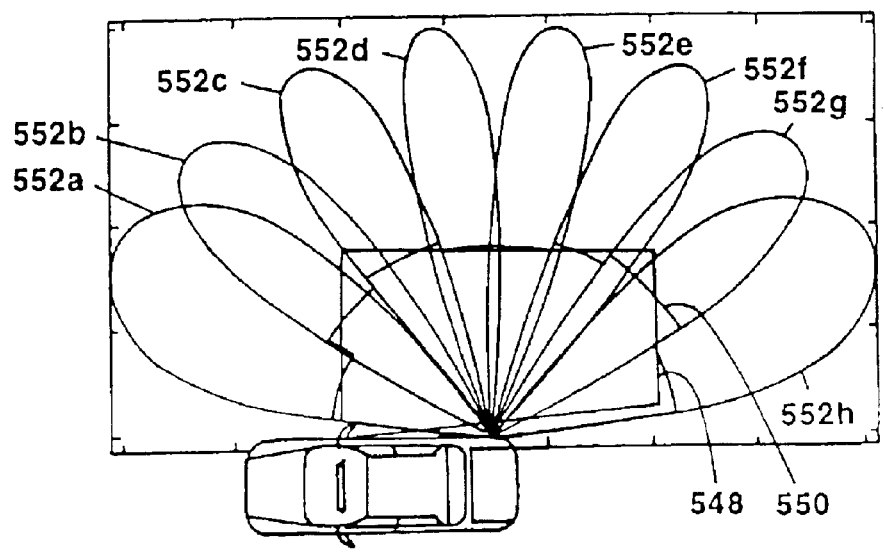

Referring now to FIGS. 11A and 11B, two different examples of side detection zones 536, 548 are shown. In FIG. 11A, the maximum detection zone boundary 536 is provided having a trapezoidal shape. An exemplary SOD system provides eight azimuthal beams 540a–540h each with a different maximum detection range, as indicated in shading, and as determined by the detection algorithm that operates upon the beam echoes. The algorithmic control of the maximum detection range of each of the eight beams defines the shape of an actual maximum detection zone boundary 538 versus the specified maximum detection zone boundary 536.

The exemplary SOD system of FIGS. 11A, 11B has eight beams, each with a beam width of approximately fifteen degrees and with a total azimuth scan of in excess of one hundred fifty degrees. It will be recognized by one of ordinary skill in the art that other numbers of beams (e.g. fewer than eight or more than eight) and scan angles are possible without departing from the present invention. The particular number of antenna beams to use in a particular application is selected in accordance with a variety of factors including but not limited to the desired detection zone 500 and the width of the probability region 524.

FIG. 11B shows a detection zone 548 having a substantially rectangular shape of the maximum boundary. Again, an exemplary system provides eight azimuthal beams 552a–552h each with a different maximum detection range as indicated in shading, the ranges 552a–552h being different from beams 540a–540h so as to form a different actual maximum detection zone 550, indicated again by shading.

Figure 12:
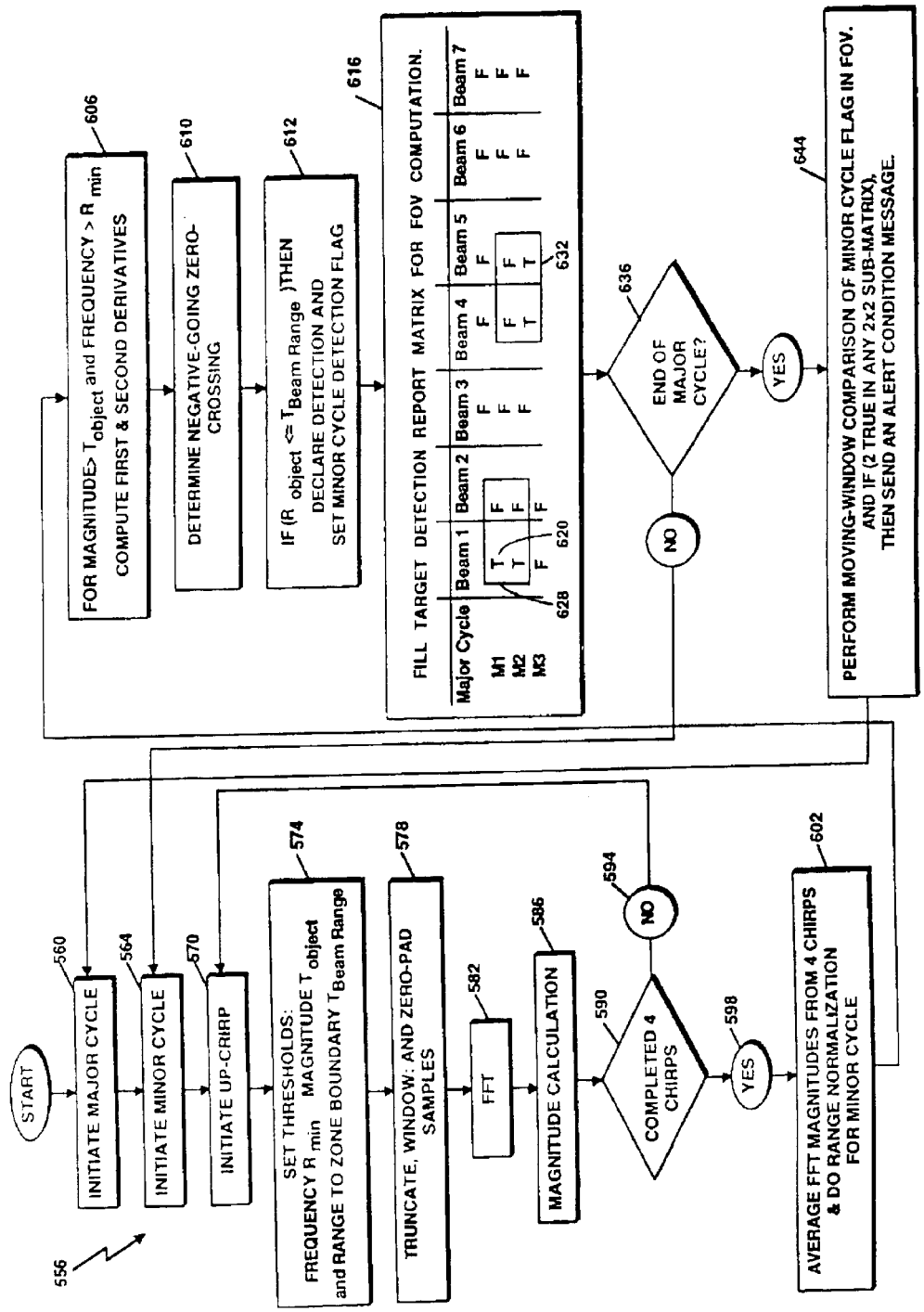
FIG. 12 is a flow chart illustrating a process implemented by a SOD system for detecting objects within a detection zone.

Referring now to FIG. 12, a flow diagram illustrates a process 556 performed by the SOD processor, such as DSP 30 of FIG. 3. The process contains major cycles and minor cycles. A minor cycle includes all detection operations that are performed utilizing a particular beam of the SOD antenna system. A major cycles includes operations that are performed utilizing the full group of beams provided by the SOD antenna system. In step 560 a major cycle is initiated and in step 564 a minor cycle is initiated. Initiating the major cycle 560 involves resetting the beam to the first beam. Initiating the minor cycle 564 involves resetting the beam to the next adjacent beam.

A chirp signal is initiated in step 570. During a chirp, a number n of digital samples of the received signal are processed by the A/D converter 68 (FIG. 3), previously described, at a rate of $f_s$ KHz, in a time period t. In the illustrative embodiment of FIG. 3, n=256, $f_s$=256 KHz, and t=1 msec.

While it will be recognized by those of ordinary skill in the art that other numbers of samples at other rates are possible with this invention, selection of n and $f_s$ determine the eventual frequency and range resolution and thus must be selected to meet all system detection requirements.

In step 574, range thresholds are established at each beam pointing angle in order to define the detection zone. Thus, at a given beam pointing angle, range detections that are either too far or too near to the SOD system to fall within the detection zone are excluded by way of pre-established range thresholds. Echo magnitude window thresholds are also established in step 574. Only object detections that produce echoes above a lower threshold and below an upper threshold, i.e. within the magnitude window, are considered valid. An echo that is below the lower threshold could be caused by system noise rather than an object or target. An echo that is above the upper threshold could be caused by an interfering radar source, such as a radar transmission from another vehicle. Thus, both range and amplitude thresholds are established at step 574. It should be recognized that by altering the range thresholds, other specified detection zone shapes and sizes can be obtained.

In step 578, the data samples are truncated, whereby a small number of samples at the beginning of the data set and at the end of the data set are removed. The removed samples may contain unwanted artifacts due to hardware limitations such as amplifier setting which can occur after switching from one antenna beam to another, etc. In the illustrative embodiment, approximately two hundred fifty six data samples remain after truncation.

Also in step 578, the remaining input samples are amplitude weighted, or windowed. Recall from the discussion of FIG. 3 that the data samples output of the A/D converter 68 are. processed by an FFT within the DSP 30. Amplitude weighting of the data samples that are input to an FFT can provide beneficial effects with regard to the minimum width of a spectral peak in the resulting frequency domain, and the sidelobe magnitude associated with each FFT frequency bin. Essentially, with a spectrally pure frequency input to an FFT, input weighting can make the resulting FFT output appear in a smaller number of frequency bins than would occur with no input weighting. Since the frequency difference between the received echo and the transmitted signal relates directly to range, then the accuracy with which the received echo frequency is detected relates directly to range accuracy. Resolving a frequency to a single FFT bin or better is desirable.

In the exemplary SOD system a Chebyshev weighting function is applied to the input samples. This weighting function provides a good compromise between spreading of a narrowband signal into multiple FFT bins and a good sidelobe suppression. It will also be recognized by those of ordinary skill in the art that various amplitude weighting functions could be applied to the input data samples, and that the weighting may be applied with a variety of techniques including both hardware and software multiplication's.

It will be recognized by those of ordinary skill in the art that an FFT output is a frequency domain spectral representation of digital input samples to the FFT, where the digital input samples are samples of a time domain analog signal. It will also be recognized that the parameters, including number of samples, n, and sample rate, $f_s$, determine the frequency resolution, or bin width, $f_r$, of the FFT output by the relation $f_r = f_s/n$. Since the range of a target is associated with the frequency of the received signal, the frequency resolution correlates to a range resolution. As has been described above, a range resolution better than 0.6 meters is required in order to achieve the specified detection zone 500 (FIG. 10).

The exemplary SOD system provides two hundred fifty six data samples, n, taken at a 256 KHz sample rate, $f_s$. Thus, the resulting FFT frequency resolution, $f_s$, is 1 KHz. The corresponding range resolution can be derived as follows. As mentioned earlier, in the illustrative SOD system 504 (FIG. 10), the frequency chirp is swept in frequency through 200 MHz in approximately 1 msec. One KHz thus represents a time period of approximately 5 nsec. In 5 nsec, radar energy can propagate a distance of approximately 1.5 meters. Since the energy propagates both to the target and back, the range to the target represented by a 1 KHz signal from the A/D converter 68 (FIG. 3) is approximately 0.75 meters. A 2 KHz signal represents a target at 1.5 meters, etc. Thus, an FFT bin width of 1 KHz corresponds to a target range resolution of 0.75 meters. This measurement accuracy does not meet the desired range resolution of less that 0.6 meters. Additional processing is thus necessary.

In the exemplary embodiment at step 578, an zero padding technique, recognized by those of ordinary skill in the art, is applied to the input samples to the FFT in order to reduce the resulting FFT bin width. It will also be recognized by those of ordinary skill in the art that other techniques may be used to reduce the FFT bin width. For example, various interpolation techniques can be applied.

The windowed and zero padded input samples are operated on with an FFT operation in step 582. Time domain data samples are collected from a chirp echo and a complex FFT is performed on the data samples. Subsequent processing can improve the measurement accuracy still further as described starting at process step 606.

In step 586, a magnitude calculation is performed on the complex FFT data, whereby the FFT real and imaginary parts of the complex FFT data are used to calculate an FFT magnitude, hereafter called FFT output data, or an FFT output signal.

As the data samples associated with a particular beam steering angle in azimuth can vary from one such data set to another, averaging of either time domain data samples or FFT output data associated with a particular beam steer angle can reduce the rate of false detections, or improve the false alarm rate. For example, where system noise or other artifacts cause variation in the detected frequency and amplitude, averaging can reduce the impact of such artifacts and thus improve system performance.

In step 590, it is determined whether four chirps have been processed, to be used in the aforementioned averaging. If four chirps have not been processed, then processing returns to step 570 where another chirp is initiated. If four chirps have been processed, then processing proceeds to step 602 in which the FFT output data from the four chirps are averaged. Whereas the exemplary SOD system uses four averaged chirps for each beam within the minor cycle timing, it will be recognized by those of ordinary skill in the art that other numbers of chirps can also be averaged.

In step 602, the resulting FFT output data is also range normalized. Whereas a radar return echo signal generally loses amplitude proportional to range, and whereas increasing FFT bins are proportional to increasing range, the FFT output data without range normalization would indicate an amplitude reduction across the FFT bins. Range normalization is provided to adjust the FFT bin amplitudes by scale factors to minimize the amplitude range dependency of the FFT output data.

In step 606, the minimum and maximum range thresholds, frequencies $R_{min}$ and $T_{BeamRange}$ respectively, and minimum magnitude threshold, $T_{object}$, are applied to the averaged FFT output data. The thresholds will be described more fully in conjunction with FIGS. 14A and 14B. Let it suffice to say here that the range thresholds limit detections to those objects that are not too close and not too far from the SOD system, specific to the particular beam pointing angle, so as to detect objects as required within a specified detection zone, for example detection zone 500 (FIG. 10).

Additional processing is required in order to achieve range accuracy much better than the 0.6 meters as required by the exemplary detection region 500. To this end, in step 606, first and second derivatives of the FFT output data are computed by the DSP, as discussed further in conjunction with FIGS. 13A and 13B. As will be explained below, range accuracy is significantly improved by use of the first and second derivatives of the FFT output data. In step 610, the negative going zero crossing of the first derivative and second derivative are computed as will be described.

The first and second derivatives of the FFT output data provide an indication of whether a detection has or has not occurred. In the case where a detection has occurred, the first and second derivatives also provide a range to the detected object. Only those objects with a range within the range thresholds, and with sufficient magnitude are considered as valid targets by the SOD system in step 612, thereby setting a minor cycle detection flag. Step 612 concludes a minor cycle of processing in which detections associated with a single beam steering angle are made.

In step 616, the minor cycle detection flag is stored in a detection table, or target detection report matrix. The table is shown in block 616 and includes columns corresponding to antenna beams and rows corresponding to major cycles. Each entry in the table is a minor cycle detection flag. A "T" (true) indicates a minor cycle detection in the associated beam detected during the minor cycle and F (false) indicates no minor cycle detection. Thus, the entry labeled 620, indicates detection in the first radar beam during a minor cycle. A complete row is obtained during each major cycle and each column of the detection table 616 comprises successive minor cycle detection flags for a given beam steering angle.

After a minor cycle detection flag is stored in the table, it is determined in step 636 whether a major cycle has ended, i.e., whether a minor cycle detection flag has been provided for the last beam. If the major cycle has not ended, then processing returns to step 564 on the next beam and steps 564–616 are repeated for that beam. Alternatively, if the major cycle has ended, thus completing a row of the detection table, then the table is analyzed in step 644.

In step 644, minor cycle detection flags stored in the detection table are logically combined to provide an alert condition message with a reduced false alarm rate. An alert condition message 644 indicates either the presence or absence of a target within the detection zone. For example, groups of four minor cycle detection flags such as those groups labeled 628 and 632 in the table may be logically combined to reduce the false alarm rate. The logically combined groups 628, 632 can span both minor and major cycles, i.e. can span more than one column or more than one row. In the illustrative embodiment, each group (e.g. group 628, 632) is a 2×2 matrix of detection flags. It will be recognized that group 632 is analyzed only at the completion of the major cycle represented by the third row of the detection table, whereas group 628 is analyzed at the completion of the major cycle represented by the second row of the table.

Each combined group 628, 632 is processed to determine if at least two detection flags within the group are true. In particular, two or more true minor cycle detection flags in a 2×2 group of minor cycle detection flags yields an alert condition message that indicates a target detection. Thus, processing of group 628 yields an alert condition message resulting from consecutive detections in beam 1 during consecutive minor cycles. Processing of group 632 likewise yields an alert condition message caused by detections in beams four and five during one major cycle. Although a particular logical combination of minor cycle detection flags has been described, it will be recognized by those of ordinary skill in the art that other logical combinations of minor cycle detection flags from one or multiple beams and from one or more major cycles are possible with this invention. Upon completion of major cycle processing in step 644, a new major cycle is initiated in step 560.

An alert condition message that indicates the presence of a target in the detection zone can cause a system action appropriate for the application. For example, a visual indication or audible alarm may be provided to alert the driver that an object is within the detection zone of a SOD system.

Figure 13:
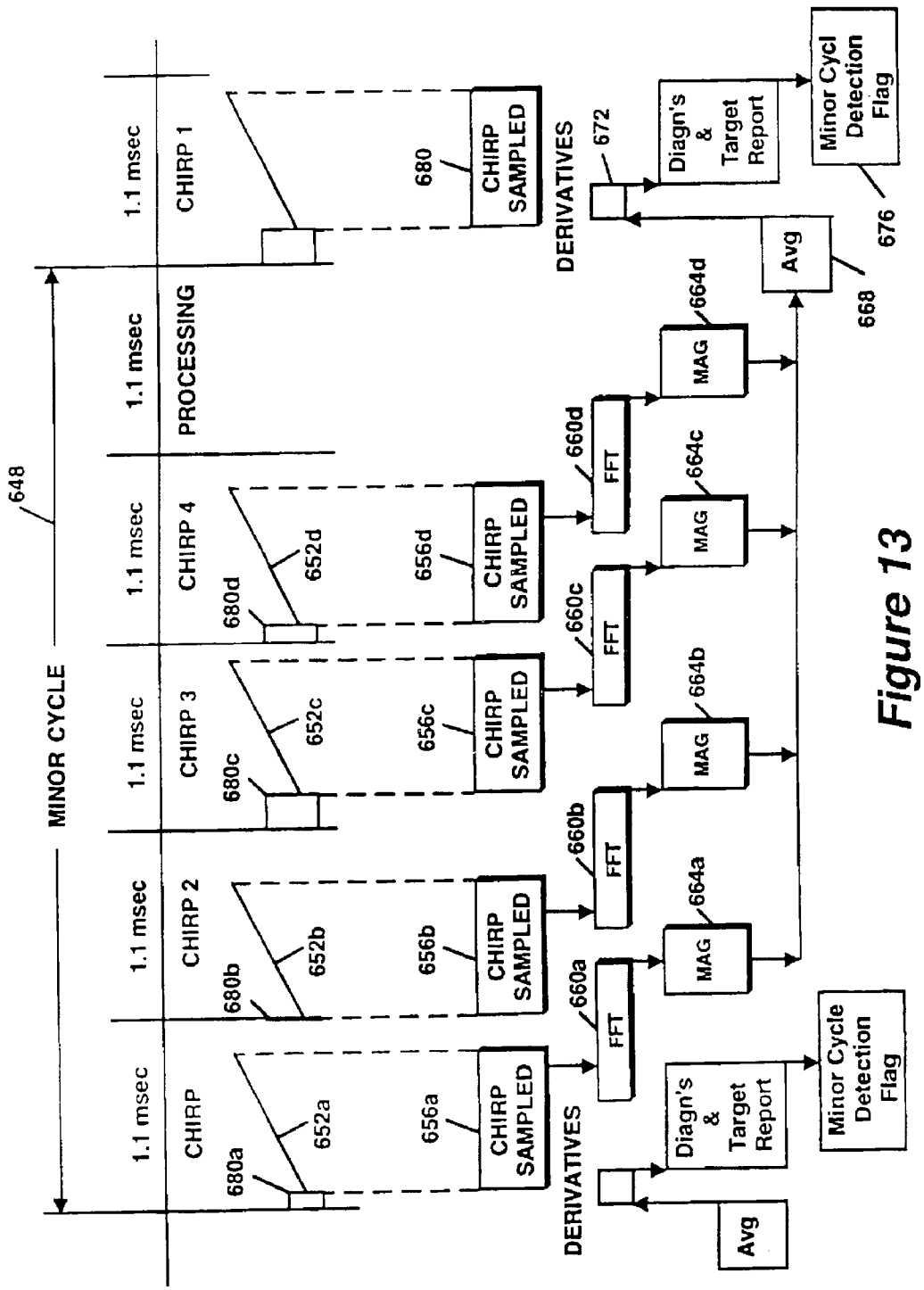
FIG. 13 is a timing chart of a minor cycle detection process included in the process of FIG. 12.
Figure 14:
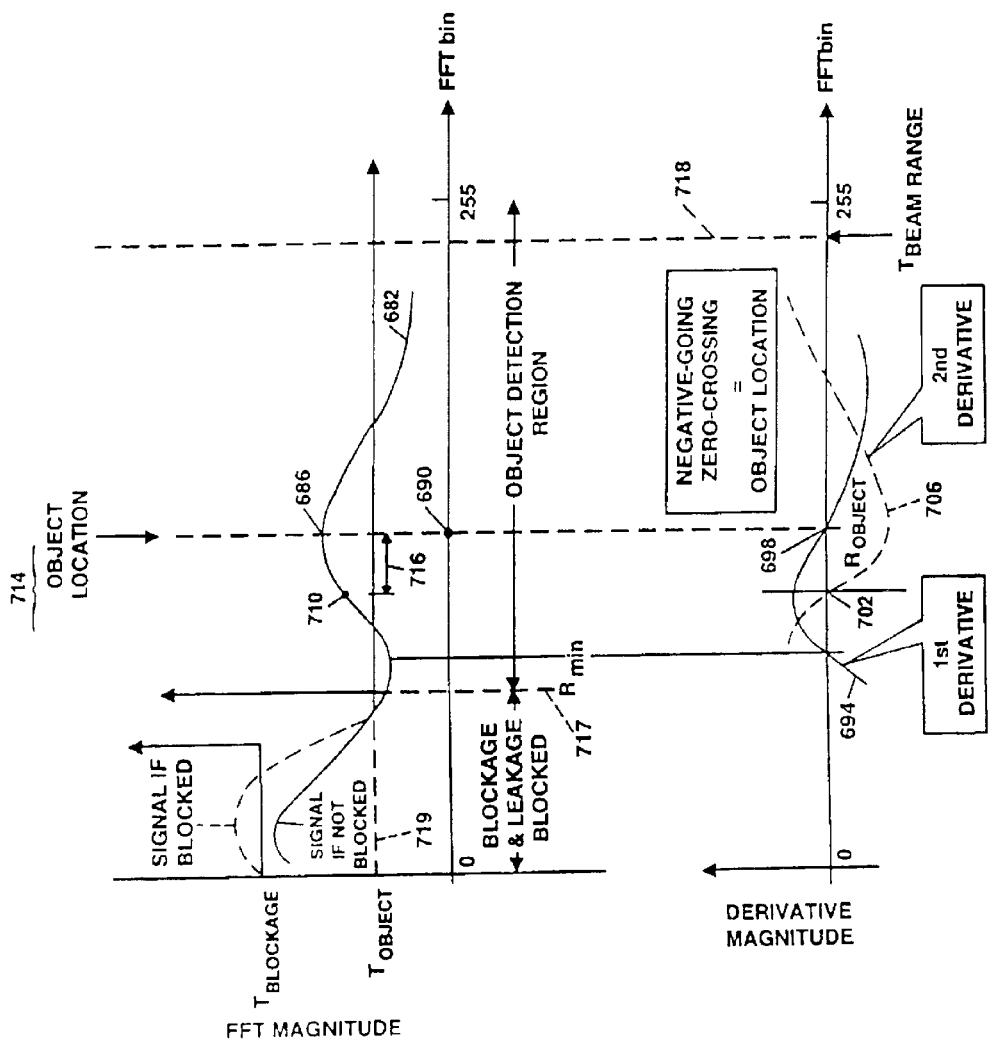
FIG. 14A is a plot of signal return fast Fourier transform (FFT) magnitude vs. FFT frequency bin which illustrates output generated at an intermediate stage of the detection process of FIG. 12.
FIG. 14B is a plot of FFT derivative magnitude vs. FFT frequency bin which illustrates first and second derivatives of the FFT output of FIG. 14A computed at another intermediate stage of the detection process of FIG. 12.

FIG. 13 shows minor cycle timing in relation to the chirp signal and processing steps. A minor cycle 648 is completed on each beam steering angle in a predetermined period of time (e.g. 5.5 ms). Within that time period, four radar chirps 652a–652d are transmitted, the chirp echo returns are differenced from the transmission and the difference is sampled during intervals 656a–656d, the differences are FFT analyzed during intervals 660a–660d, the FFT magnitudes are calculated during intervals 664a–664d, and the four FFT output data are averaged at interval 668. First and second derivatives are computed and analyzed during interval 672, and a minor cycle detection flag is generated at interval 676. The minor cycle 648 is then repeated for the next beam. Note that the processing associated with intervals 668, 672, and 676 is performed coincidentally with sampling of the first chirp 680 in the next minor cycle.

Randomly variable chirp offset intervals 680a–680d as described above in conjunction with FIGS. 5 and 5A provide a reduction in false detections caused by receptions from other radars including other SOD systems.

The overall minor and major cycle timing is selected in order to detect objects within a specified time period so that system actions can be taken in an appropriate amount of time. For the illustrative SOD system 504 (FIG. 10), an alert condition message is generated at the completion of each major cycle, i.e. at the completion of seven minor cycles. Thus, an alert condition message is generated in approximately once every 50 msec. The CAN microprocessor 80 (FIG. 9) has an asynchronous update rate for the overall vehicle of approximately 300 msec. Thus, several major cycles and associated alert condition messages are generated during each CAN cycle. While specific timing selections have been described for the illustrative embodiment, it should be recognized that other timing selections are possible. For example, averaging of other than four FFTs, and use of other than seven beams are possible. One of ordinary skill in the art, after reading this description would clearly understand how to implement any necessary modification to the timing structure of FIG. 13.

Referring now to FIGS. 14A and 14B an illustrative FFT output data curve 682 as may be generated in step 602 of FIG. 12 contains a magnitude detection peak 686 at a detection frequency 690 that corresponds to a particular detection range and one or more FFT bins. It should be recognized that the detection peak 686 from a single target may be broader than a single FFT bin. As mentioned above, the broadening of the detected echo in the frequency domain is related to aspects of the particular FFT, in particular the weighting function that may be applied the input data samples to the FFT. Broadening can also be related to physical aspects of the echoing target, such as the dimension of the target along the axis of the particular radar beam. An extended target has an extended range and thus may appear as a broadened frequency corresponding to the range.

In general, the peak 686 of the FFT output data curve 682 for a single target is a frequency 690 that corresponds to the range to the target. However, in association with FIGS. 15 and 16, it will be seen that the peak can give a false impression of the range to the target in some cases. For now, let us assume that the peak of the FFT output data curve indicates the range to the target.

As has been discussed in association with the detection algorithm 556 of FIG. 12, the FFT frequency bins may not be sufficiently narrow to provide the required accuracy required for a particular detection zone. Where the detected signal from a single target is spread between several FFT bins, additional processing must be done on the FFT output data in order to provide sufficient range resolution.

Consideration of the first derivative 694 of the FFT output data curve 682 reveals that the peak 686 of the FFT output data curve 682 is coincident with the negative going zero crossing 698. Thus, the negative going zero crossing 698 of the first derivative 694, provides the frequency 690 of the FFT peak 686, and thus, the corresponding range to the target. Range detection in this manner provides greater accuracy than simply determining the range by determining the fractional frequency bin of the FFT output data curve 682 in which the peak occurs since the peak may occur in multiple FFT bins.

It should be recognized that although FIGS. 14A and 14B show the FFT output data curve 682 and FFT first derivative 694 as smooth continuous waveforms, the FFT output data, represented by FFT output data curve 682, and first derivative 694 are comprised of discontinuous digital samples. As a result, finding the zero crossing of the first derivative 694 requires additional processing. If the spacing of the points of the first derivative 694 are sufficiently close, then adjacent first derivative data points lie approximately on a straight line. With this approximation, the zero crossing 698 can be found by a conventional similar triangles technique. In the illustrative embodiment, spacing between data points on the order of 500 Hz has been found to be sufficient. However, it will be recognized by those of ordinary skill in the art that other data point frequency spacings can be used with this invention. It should be noted that the zero crossing 698 of the first derivative so determined can be at any frequency and need not be at the center of an FFT bin, thus the resolution in frequency and associated range resolution is greatly improved as compared to the conventional technique of determining the frequency bin in which the FFT peak 686 occurs.

For complex echo returns, for example from multiple targets or from a target that is extended along the beam axis, the negative going zero crossing 702 of the second derivative 706 is determined and provides greater range discrimination that the use of the first derivative in the above manner. The negative zero crossing 702 of the second derivative 706 of the FFT output data curve 682 corresponds to a negative inflection point 710 of the FFT output data curve 682. A negative inflection point 710, is a point where the slope of the FFT output data curve 682 changes from curving upward to curving downward.

It will be recognized that the rising portion of an FFT output data feature, for example 714, has a discrete negative inflection point 710, whereas the peak 686 of the feature can be extended along the frequency axis. Although the broadening of an FFT output data feature is related to both to mathematical characteristics of the FFT, such as the input sample weighting, and to dimensional characteristics of the target, the shape of the rising portion of the FFT output data feature 714 is, to a first order, related only to the FFT mathematical characteristics. The negative inflection point 710 on the rising portion of the FFT output data feature 714 can be used to predict the frequency of the FFT peak 686 as may be desirable where the peak 686 is not otherwise distinct. In essence, for a relatively broad range of target dimensional characteristics, the distance 716 between the negative inflection point 710 and the FFT peak 686, is known and constant, determined only by the mathematics of the FFT. Thus, by finding the first negative inflection point 710 of the rising portion of an FFT output data feature 714, and by using the negative inflection point 710 to predict the position of the peak 686, the range to the target can be found even for more complex FFT output data curve spectral shapes.

As noted in conjunction with step 606 in FIG. 12, thresholds $R_{min}$ 717 and $T_{BeamRange}$ 718, specific to the particular beam pointing angle, are applied to the calculated frequency of an object range as calculated by either first derivative or second derivative test. In particular, those peaks within the thresholds will be considered valid. Similarly, only those peaks that are above a magnitude threshold $T_{object}$ 719 are considered valid.

Figure 15:
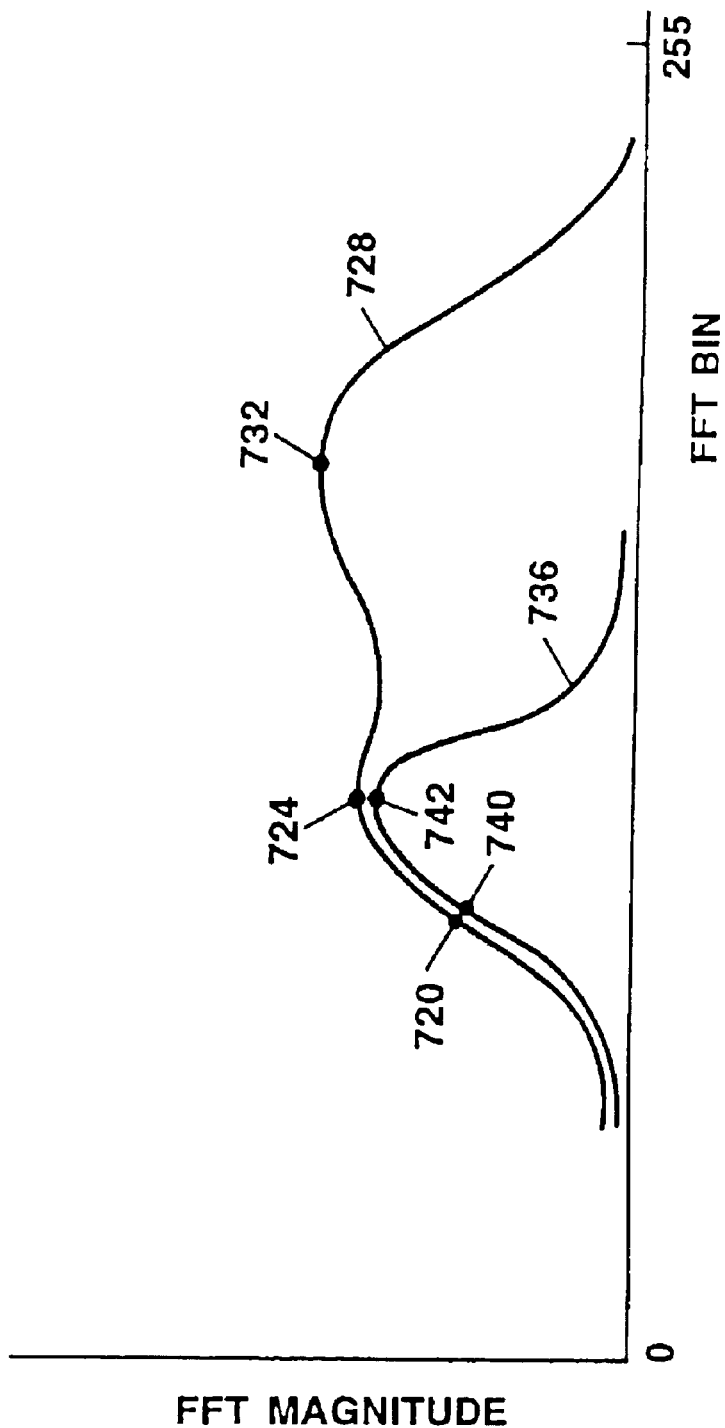
FIG. 15 is a plot of signal return FFT magnitude vs. FFT frequency bin which illustrates an exemplary FFT output resulting from detection of a geometrically extended target and an illustrative FFT output resulting from detection of a non-extended target at the same range.

Referring now to FIG. 15 an example curve 728 corresponding to FFT output data as may be caused by a target that is extended along the beam axis so as to result in a nearly flat top FFT output data curve for which a peak would be indeterminate or result in multiple peak detections 724, 732 is shown. Also shown is curve 736 which corresponds to FFT output data resulting from a non-extended target. Comparison of the FFT output data curve 728 with the FFT output data curve 736 reveals coincident negative inflection points 720, 740. Thus, computation of the second derivative of the FFT output data curve 728 and use of the resulting negative zero crossing to determine peak 724 by adding the known distance, i.e. frequency, between negative inflection point 720 and peak 724 as described above, results in an accurate range determination.

Figure 16:
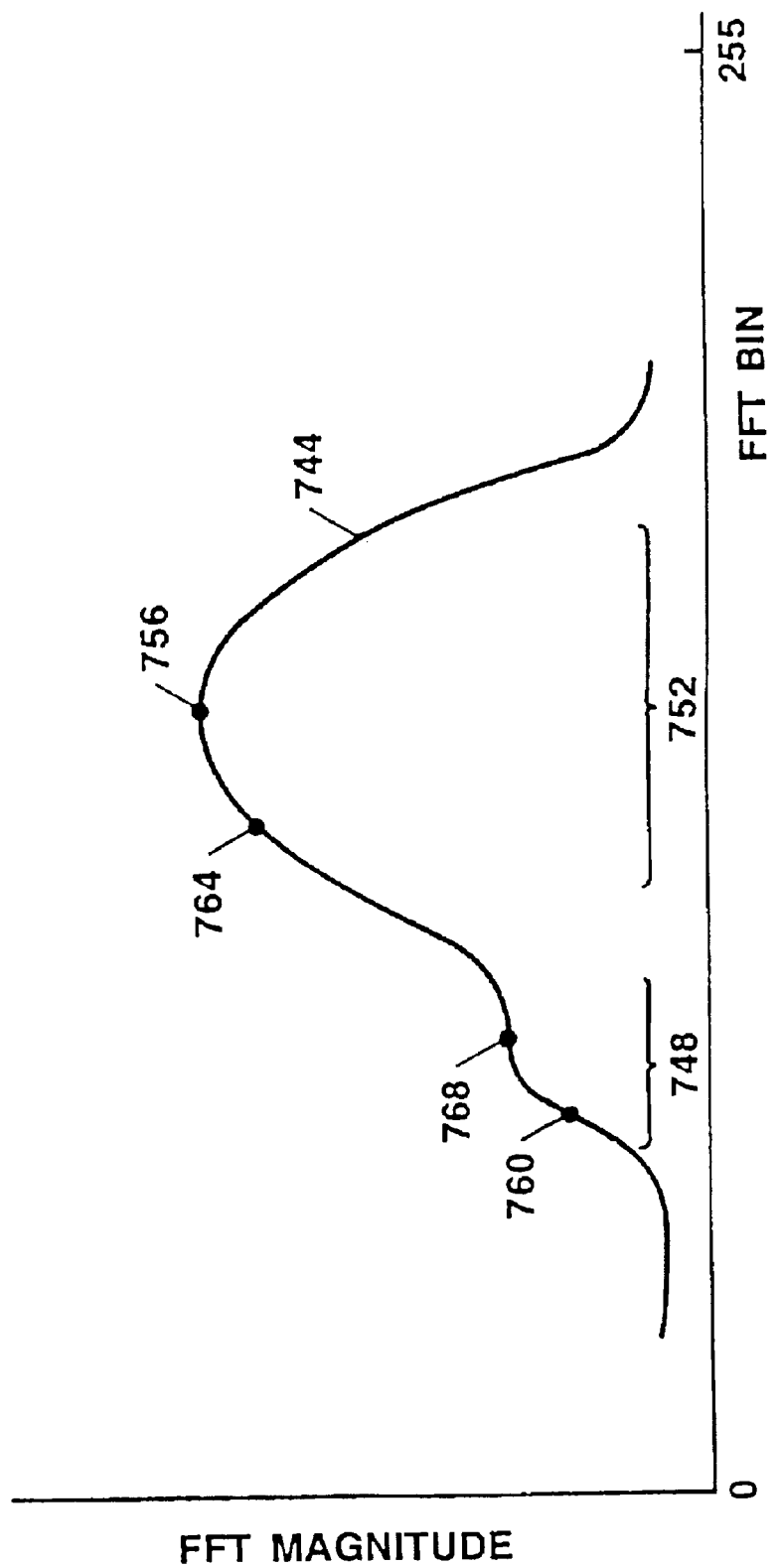
FIG. 16, is a plot of signal return FFT magnitude vs. FFT frequency bin which illustrates exemplary FFT outputs associated with detections of two proximate targets.

Referring now to FIG. 16, another curve 744 corresponding to an example of FFT output data as may be caused by simultaneous receipt of echoes from two targets, of which one is weaker than the other is shown. Note that a strong echo can cause the curve portion 748 of the composite FFT output data curve 744 associated with the weaker echo to have no peak at all, while the curve portion 752 from the stronger target has a distinct peak 756. Still, the negative inflection points 760, 764 found by computing the second derivative of the composite FFT output data curve 744 can be used to predict the range of both targets. Detection of the two negative zero crossings of the second derivative of FFT output data curve 744 and use of the known distance, like distance 716 of FIG. 14A, results in detection of peak frequency points 768 and 756. A first negative inflection point 760 is used to find the peak 768 corresponding to the first target range, though a peak 768 does not in fact exist. A second negative inflection point 764 is used to similarly find the peak 756 corresponding to the second target range. Since the frequency peaks correspond to target range, the range to both the strong and weak target can be discriminated. Thus, use of the second derivative of the FFT output data provides range discrimination for targets represented by more complex FFT output data curves.

Having described the preferred embodiments of the invention, it will now become apparent to one of ordinary skill in the art that other embodiments incorporating their concepts may be used.

It will be appreciated by those of ordinary skill in the art that the particular boundaries between portions of the radar system 10 can be varied from that described herein above. As examples, the receiver 24 may include parts of the electronic control circuits 34 or parts of the receiver, such as an A/D converter (FIG. 2), may be provided in the electronics portion 28 of the system. Depending upon the selected implementation of the various components, one or more portions of the radar system may be integrated onto one or more hybrid circuits, modules, or subassemblies.

It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A method for detecting an object with a radar system comprising:

generating a detection table including a plurality of indicators comprising processed radar data from at least two major cycles, with each major cycle having a plurality of minor cycles, each one of the plurality of indicators indicative of the presence of the object, and selected ones of the plurality of indicators indicative of the presence of the object within an equivalent azimuth angle and within equivalent predetermined minimum and maximum ranges corresponding to a predetermined detection zone;

combining at least two of the plurality of indicators to confirm the presence of the object and to provide combined indicators; and providing an object detection message if the combined indicators are indicative of the presence of the object.

2. The method of claim 1 wherein each one of the plurality of indicators contained in the detection table is associated with a respective radar beam and with a respective major cycle.

3. The method of claim 2 wherein at least two of the combined indicators are associated with different radar beams.

4. The method of claim 2 wherein at least two of the combined indicators are associated with different major cycles.

5. The method of claim 1, wherein each of the plurality of indicators is associated with a zero crossing of a derivative of an FFT output signal.

6. The method of claim 1, wherein each of the plurality of indicators is associated with a coverage zone associated with a side object detection system adapted for use on an automobile.

7. The method of claim 1, wherein a minor cycle corresponds to processing performed on a respective radar beam associated with a respective azimuth angle and a major cycle corresponds to a plurality of minor cycles associated with a respective plurality of radar beams, wherein each of the plurality of radar beams is associated with a different azimuth angle.

8. A radar system for detecting an object, comprising:
a memory in which is stored a detection table including a plurality of indicators, comprising processed radar data from at least two major cycles, with each major cycle having a plurality of minor cycles, each one of the plurality of indicators indicative of the presence of the object, and selected ones of the plurality of indicators indicative of the presence of the object within an equivalent azimuth angle and within equivalent predetermined minimum and maximum ranges corresponding to a predetermined detection zone; and
a processor for combining at least two of the plurality of the indicators in the detection table to confirm the presence of the object and to provide combined indicators, and for providing an object detection message if the combined indicators are indicative of the presence of the object.

9. The radar system of claim 8 wherein each one of the plurality of indicators contained in the detection table is associated with a respective radar beam and with a respective major cycle.

10. The radar system of claim 9 wherein at least two of the combined indicators are associated with different radar beams.

11. The radar system of claim 9 wherein at least two of the combined indicators are associated with different major cycles.

12. The radar system of claim 8, wherein each of the plurality of indicators is associated with a zero crossing of a derivative of an FFT output signal.

13. The radar system of claim 8, wherein each of the plurality of indicators is associated with a coverage zone associated with a side object detection system adapted for use on an automobile.

14. The method of claim 8, wherein a minor cycle corresponds to processing performed on a respective radar beam associated with a respective azimuth angle and a major cycle corresponds to a plurality of minor cycles associated with a respective plurality of radar beams, wherein each of the plurality of radar beams is associated with a different azimuth angle.

15. A method for detecting an object with a radar system comprising:
generating a detection table having a plurality of indicators comprising processed radar data from at least two major cycles, with each major cycle having a plurality of minor cycles, each one of the plurality of indicators indicative of the presence of the object;
combining at least two of the plurality of indicators included in the detection table to confirm the presence of the object and to provide combined indicators, the at least two of the plurality of indicators associated with at least two different major cycles and at least two different minor cycles; and
providing an object detection message if the combined indicators are indicative of the presence of the object.

16. The method of claim 15, wherein each one of the plurality of indicators contained in the detection table is associated with a respective radar beam.

17. The method of claim 15, wherein each one of the plurality of indicators is associated with a detection zone associated with a side object detection system adapted for use on an automobile.

18. The method of claim 15, wherein a minor cycle corresponds to processing performed on a respective radar beam associated with a respective azimuth angle.

* * * * *

UNITED STATES PATENT AND TRADEMARK OFFICE
CERTIFICATE OF CORRECTION

| | | |
|---|---|---|
| PATENT NO. | : 6,864,831 B2 | Page 1 of 2 |
| APPLICATION NO. | : 10/229256 | |
| DATED | : March 8, 2005 | |
| INVENTOR(S) | : Woodington et al. | |

It is certified that error appears in the above-identified patent and that said Letters Patent is hereby corrected as shown below:

<u>Title page,</u>
Item [22], PCT Filed, delete "August 26, 2002" and replace with -- August 27, 2002 --.

<u>Column 3,</u>
Line 3 delete "FIG. 5A is plot" and replace with -- FIG. 5A is plot --.
Line 15, delete "FIG. 7 is detailed a block" and replace with
-- FIG. 7 is a detailed block --.

<u>Column 4,</u>
Line 43, delete "Such as car," and replace with -- Such as a car, --.

<u>Column 5,</u>
Line 48, delete "portions of vehicle" and replace with -- portions of the vehicle --.

<u>Column 7,</u>
Line 51, delete "receive antenna 16, 18" and replace with -- receive antennas 16, 18 --.

<u>Column 8,</u>
Lines 56-57, delete "frequency detector 72 and 74" and replace with -- of the blind spot would --.

<u>Column 13,</u>
Line 58, delete "of the blind would" and replace with -- of the blind spot would --.

<u>Column 15,</u>
Line 65, delete "A major cycles" and replace with -- A mayor cycle --.

UNITED STATES PATENT AND TRADEMARK OFFICE
CERTIFICATE OF CORRECTION

PATENT NO.        : 6,864,831 B2
APPLICATION NO.   : 10/229256
DATED             : March 8, 2005
INVENTOR(S)       : Woodington et al.

It is certified that error appears in the above-identified patent and that said Letters Patent is hereby corrected as shown below:

Column 16,
Line 38, delete "setting" and replace with -- settling --.
Line 45, delete "are. Processed" and replace with -- are processed --.
Line 67, delete "multiplication's." and replace with -- multiplications. --.

Column 17,
Line 29, delete "less that 0.6" and replace with -- less than 0.6 --.
Line 31, delete "an zero" and replace with -- a zero --.

Column 19,
Lines 60-61, delete "an zero" and replace with -- a zero --.

Column 20,
Line 16, delete "applied the input" and replace with -- applied to the input --.

Column 21,
Line 5, "that the use" and replace with -- than the use --.
Lines 16-17, delete "to both to mathematical" and replace with
-- both to mathematical --.
Line 39, delete "derivative test." and replace with -- derivative tests. --.

Signed and Sealed this

Fourth Day of July, 2006

JON W. DUDAS
*Director of the United States Patent and Trademark Office*